US012179247B2

(12) United States Patent
Sakai et al.

(10) Patent No.: US 12,179,247 B2
(45) Date of Patent: Dec. 31, 2024

(54) FOIL TRANSFER DEVICE

(71) Applicant: Brother Kogyo Kabushiki Kaisha, Nagoya (JP)

(72) Inventors: Ryosuke Sakai, Nagoya (JP); Tomoya Yamamoto, Kasugai (JP); Ayaka Ohira, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 32 days.

(21) Appl. No.: 18/190,720

(22) Filed: Mar. 27, 2023

(65) Prior Publication Data

US 2023/0234118 A1 Jul. 27, 2023

Related U.S. Application Data

(63) Continuation of application No. PCT/JP2021/034217, filed on Sep. 17, 2021.

(30) Foreign Application Priority Data

Oct. 26, 2020 (JP) ................................ 2020-178959

(51) Int. Cl.
*B21D 22/02* (2006.01)
*B21D 37/16* (2006.01)
(Continued)

(52) U.S. Cl.
CPC ........... *B21D 22/022* (2013.01); *B21D 37/16* (2013.01); *B44C 1/1729* (2013.01); *B65H 7/20* (2013.01);
(Continued)

(58) Field of Classification Search
CPC ........... B32B 37/0053; B32B 37/1054; B32B 2037/0061; B32B 41/00
See application file for complete search history.

(56) References Cited

U.S. PATENT DOCUMENTS 2,584,002 A * 1/1952 Elser .................. B29C 65/1432 156/290
5,639,339 A * 6/1997 Couillard ............ B32B 37/0053 492/54
(Continued)

FOREIGN PATENT DOCUMENTS

JP H07-290685 A 11/1995
JP 2002-166476 A 6/2002
(Continued)

OTHER PUBLICATIONS

Jan. 16, 2024—(JP) Notice of Reasons for Refusal—App 2020-178959.
(Continued)

*Primary Examiner* — Jason L Vaughan
(74) *Attorney, Agent, or Firm* — Banner & Witcoff, Ltd.

(57) ABSTRACT

A foil transfer device which transfers foil onto a sheet is disclosed herein. When a nip/release mechanism moves a first roller and starts causing a foil film to be pressed against a confined surface region on a sheet, located apart from a leading edge of the sheet, a controller executes: a first process of causing a conveyor roller to start conveyance of the sheet, while the first roller is positioned in a separate position; a second process of causing the conveyor roller to stop conveyance of the sheet before a foil transfer area reaches a transfer position; a third process of causing the nip/release mechanism to start moving the first roller from
(Continued)

the separate position to a nipping position while the conveyance of the sheet is stopped; and a fourth process of causing the conveyor roller to restart conveyance of the sheet before the first roller reaches the nipping position.

13 Claims, 12 Drawing Sheets

(51) Int. Cl.

| | |
|---|---|
| ***B44C 1/17*** | (2006.01) |
| ***B65H 7/20*** | (2006.01) |
| ***B65H 20/02*** | (2006.01) |
| ***B65H 27/00*** | (2006.01) |
| ***B65H 29/12*** | (2006.01) |
| ***B65H 37/00*** | (2006.01) |
| ***B65H 43/00*** | (2006.01) |

(52) U.S. Cl.

CPC ............. *B65H 20/02* (2013.01); *B65H 27/00* (2013.01); *B65H 37/002* (2013.01); *B65H 43/00* (2013.01); *B65H 29/125* (2013.01)

(56) References Cited

U.S. PATENT DOCUMENTS

| | | | | |
|---|---|---|---|---|
| 5,738,754 | A * | 4/1998 | Hill | B32B 37/0053 156/555 |
| 6,769,466 | B2 * | 8/2004 | Osumi | B32B 38/1825 156/352 |
| 2002/0074090 | A1 | 6/2002 | Osumi et al. | |
| 2016/0276701 | A1 * | 9/2016 | Sale | H01M 10/0404 |
| 2021/0347198 | A1 | 11/2021 | Yamamoto et al. | |
| 2022/0016878 | A1 | 1/2022 | Yamamoto et al. | |

FOREIGN PATENT DOCUMENTS

| | | |
|---|---|---|
| JP | 2020-121467 A | 8/2020 |
| JP | 2020-121722 A | 8/2020 |

OTHER PUBLICATIONS

Oct. 26, 2020—(WO) Written Opinion of ISA—Intl App PCTJP2021034217.

Oct. 26, 2021—International Search Report—Intl App PCTJP2021034217.

* cited by examiner

FOIL TRANSFER DEVICE

REFERENCE TO RELATED APPLICATIONS

This application is a continuation application of International Application No. PCT/JP2021/034217 filed on Sep. 17, 2021 which claims priority from Japanese Patent Application No. 2020-178959 filed on Oct. 26, 2020. The entire contents of the prior applications are incorporated herein by reference.

BACKGROUND ART

A foil transfer device including a supply reel, a take-up reel, a heating roller and a pressure roller is known in the art. A foil film wound on the supply reel is to be taken up on the take-up reel. A sheet is laid on the foil film and fed through between the heating roller and the pressure roller. The heating roller heats the foil film and the sheet being nipped between the heating roller and the pressure roller. As the heating roller and the pressure roller rotate, the foil film and the sheet nipped therebetween are forwarded by the heating roller and the pressure roller whereby foil can be transferred onto an image (e.g., toner image) on the sheet. This process will be hereinafter called "foil transfer".

DESCRIPTION

The conventional foil transfer device may be configured to start feeding a sheet upon receipt of a foil transfer instruction, and if conveyance of the sheet is started while the heating roller and the pressure roller are being pressed against each other, the foil film would disadvantageously be transported and taken up uselessly. Thus, the heating roller and the pressure roller may be located apart from each other at startup and caused to be pressed against each other just before starting foil transfer at a transfer position between the heating roller and the pressure roller, so that useless transport of the foil film can be reduced. In this scheme, if the heating roller and the pressure roller get pressed against each other while a sheet fed to the transfer position is being conveyed between the heating roller and the pressure roller, resistance acting on a sheet when the heating roller and the pressure roller are getting pressed against each other would possibly produce warpage or wrinkling in the sheet; therefore, it is conceivable that the conveyance of a sheet is stopped before the heating roller and the pressure roller get pressed against each other, so that the heating roller and the pressure roller are pressed against each other while the sheet not being conveyed is located between the heating roller and the pressure roller.

However, if the heating roller and the pressure roller are pressed against each other while a sheet of which the conveyance is stopped is located between the heating roller and the pressure roller, heat and pressure applied to the sheet by the heating roller and the pressure roller getting pressed against each other would disadvantageously make impressed marks in the sheet.

It would be desirable to reduce useless conveyance and resulting waste of the foil film while reducing impressed marks which would be made in the sheet.

An improved foil transfer device for transferring foil onto a sheet laid on a foil film containing the foil is proposed herein. In one aspect, the foil transfer device comprises a heating roller, a pressure roller, a nip/release mechanism, a conveyor roller, and a controller. The heating roller is configured to heat the foil film and the sheet. The pressure roller is configured to rotate, with the foil film and the sheet being nipped between the heating roller and the pressure roller, to thereby cause the sheet to move forward together with the foil film. The nip/release mechanism is configured to move a first roller that is one of the heating roller and the pressure roller, relative to a second roller that is another of the heating roller and the pressure roller, between a nipping position in which the first roller is pressed against the second roller, and a separate position in which the first roller is located apart from the second roller. The conveyor roller is configured to convey the sheet to a transfer position in which the foil film and the sheet are to be nipped between the heating roller and the pressure roller to transfer foil onto the sheet. The controller is configured to exercise control over the nip/release mechanism and the conveyor roller, and capable of executing a foil transfer process in a foil save mode in which foil is transferred partially on a surface of the sheet by causing the foil film to be pressed against a confined surface region that is a part of an entire area of the surface of the sheet as defined by front and rear boundaries thereof on the sheet in a direction of conveyance of the sheet. When the nip/release mechanism is caused to move the first roller and starts causing the foil film to be pressed against the confined surface region of a sheet, of which the front boundary is located apart from a leading edge of the sheet, the controller executes a first process, a second process, a third process, and a fourth process. The first process is a process of causing the conveyor roller to start conveyance of the sheet, while the first roller is positioned in the separate position. The second process is a process of causing the conveyor roller to stop conveyance of the sheet before a foil transfer area defined on the surface of the sheet as an area onto which foil is to be transferred reaches the transfer position. The third process is a process of causing the nip/release mechanism to start moving the first roller from the separate position to the nipping position while the conveyance of the sheet is stopped. The fourth process is a process of causing the conveyor roller to restart conveyance of the sheet before the first roller reaches the nipping position.

With this configuration, when the foil film starts being pressed against a confined surface region on a sheet which is located apart from the leading edge of the sheet in the foil save mode, the conveyance of the sheet is stopped before the first roller starts being moved to the nipping position, and the conveyance of the sheet is restarted before the first roller reaches the nipping position, so that time elapsing while the foil film is being pressed against the sheet of which conveyance is stopped can be shortened. Therefore, useless conveyance and resulting waste of the foil film can be reduced, and the likelihood of leaving undesired impressed marks in the sheet can be diminished.

In the foil transfer device as described above, the controller may be configured to cause the conveyor roller to restart the conveyance of the sheet in the fourth process after the first roller and the second roller are caused to be positioned in contact with foil film or the sheet before the first roller reaches the nipping position.

With this configuration, in which the conveyance of the sheet is not restarted until the first roller and the second roller are caused to be positioned in contact with the foil film or the sheet, the resistance acting on the sheet if the sheet is being conveyed when the first roller or the second roller comes in contact with the sheet, thus hindering the conveyance of the sheet, can be obviated. Warpage or wrinkling as would be produced in the sheet between the conveyor roller and the pressure roller can be restrained more effectively.

The foil transfer device as described above may further comprise a separation sensor that detects a position of the first roller, and the controller may be configured to determine a time of restarting conveyance of the sheet in the fourth process, based on a signal received from the separation sensor.

The foil transfer device as described above may further comprise a sheet sensor located in a position upstream of the heating roller along a path of conveyance of the sheet to detect the sheet, and the controller may be configured to determine a time of stopping conveyance of the sheet in the second process, based on a period of time that has elapsed from a time of detection of a leading edge of the sheet by the sheet sensor.

The above and other aspects, their advantages and further features will become more apparent by describing in detail illustrative, non-limiting embodiments thereof with reference to the accompanying drawings.

Figure 1A:
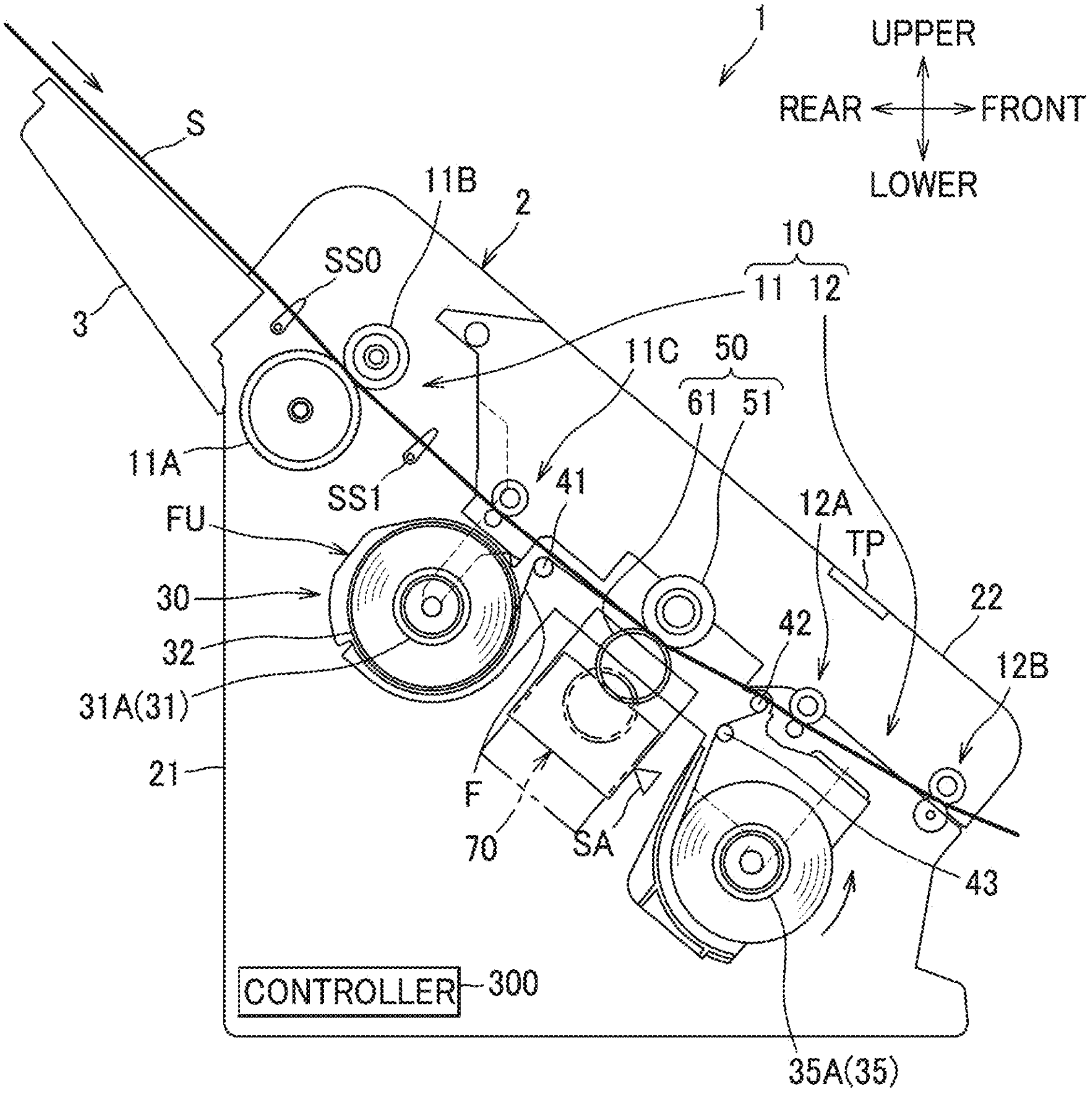
FIG. 1A is a schematic diagram of a foil transfer device.

One illustrative embodiment of the foil transfer device will be described below in detail with reference made to the drawings where appropriate. In the following description, directions will be referred to as directions shown in FIG. 1A. That is, the right-hand side of FIG. 1A is referred to as "front", the left-hand side of FIG. 1A as "rear", the front side of the drawing sheet of FIG. 1A as "left", and the back side of the drawing sheet of FIG. 1A as "right". Similarly, upward/downward directions (upper/lower sides) of FIG. 1A are referred to as "upward/downward (upper/lower)".

As shown in FIG. 1A, a foil transfer device 1 is a device for post-processing to be subjected to a sheet S on which an image is formed (e.g., printed in ink) by an image forming apparatus, for example, a toner image is formed by a laser printer; more specifically, a device for transferring foil such as of aluminum or the like onto the toner image on the sheet S. The foil transfer device 1 includes a housing 2, a sheet tray 3, a sheet conveyor unit 10, a film supply unit 30, and a transfer unit 50.

The housing 2 is made of plastic or the like, and includes a housing main body 21 and a cover 22. The housing main body 21 has an opening 21A at its upper side (see FIG. 2). The opening 21A is an opening through which to allow a film unit FU as will be described later to be installed into or removed from the housing main body 21. The cover 22 is a member for opening and closing the opening 21A. A rear end portion of the cover 22 is rotatably supported by the housing main body 21. The cover 22 is configured to be rotatable between a closed position in which the opening 21A is closed (position in FIG. 1A) and an open position in which the opening 21A is open (position in FIG. 2).

The sheet tray 3 is a tray on which sheets S such as paper, OHP film, etc., are placed. The sheet tray 3 is provided at a rear portion of the housing 2. The sheets S are placed on the sheet tray 3, with surfaces thereof having toner images formed thereon facing downward. A seat tray sensor SS0 is provided at the sheet tray 3. The sheet tray sensor SS0 is configured to detect a sheet(s) S placed on the sheet tray 3. The sheet tray sensor SS0 outputs an ON signal when a sheet S (or sheets S) is placed on the sheet tray 3, and outputs an OFF signal when no sheet S is placed on the sheet tray 3.

The sheet conveyor unit 10 includes a sheet feed mechanism 11 and a sheet ejection mechanism 12. The sheet feed mechanism 11 is a mechanism that conveys sheets S on the sheet tray 3 one by one toward the transfer unit 50. The sheet feed mechanism 11 includes a pickup roller 11A, a retard roller 11B, and an upstream conveyor roller 11C. The upstream conveyor roller 11C is an example of a conveyor roller.

The pickup roller 11A is a roller that feeds a sheet S on the sheet tray 3 toward the transfer unit 50. The retard roller 11B is a roller that separates, from other sheets S on the sheet tray 3, one sheet S to be conveyed by the pickup roller 11A.

The retard roller 11B is located above the pickup roller 11A. The retard roller 11B is configured to be rotatable in such a direction that the sheets S stacked on the sheet S to be fed forward by the pickup roller 11A are moved back to the sheet tray 3.

The upstream conveyor roller 11C includes two rollers. A sheet S nipped between the two rollers of the upstream conveyor roller 11C can be conveyed as the rollers rotate. The upstream conveyor roller 11C is located in a position upstream of transfer unit 50 along a path of conveyance of the sheet S, and configured to convey a sheet S fed by the pickup roller 11A, to the transfer unit 50. Hereafter, a direction of conveyance of the sheet S in which the path of conveyance of the sheet S extends will be referred to simply as "conveyance direction".

The sheet ejection mechanism 12 is a mechanism that ejects a sheet S which has passed through the transfer unit 50, to the outside of the housing 2. The sheet ejection mechanism 12 includes a downstream conveyor roller 12A and an ejection roller 12B.

Each of the downstream conveyor roller 12A and the ejection roller 12B includes two rollers. A sheet S nipped between the two rollers of each of the downstream conveyor roller 12A and the ejection roller 12B can be conveyed as the rollers rotate. The downstream conveyor roller 12A is located between the transfer unit 50 and the ejection roller 12B, and configured to convey a sheet S received from the transfer unit 50 to the ejection roller 12B. The ejection roller 12B is located downstream of the downstream conveyor roller 12A in the direction of conveyance of the sheet S, and configured to eject a sheet S forwarded by the downstream conveyor roller 12A to the outside of the housing 2.

The film supply unit 30 is a unit that supplies and lays a foil film F onto a sheet S conveyed from the sheet feed mechanism 11. The film supply unit 30 includes a film unit FU.

Figure 2:
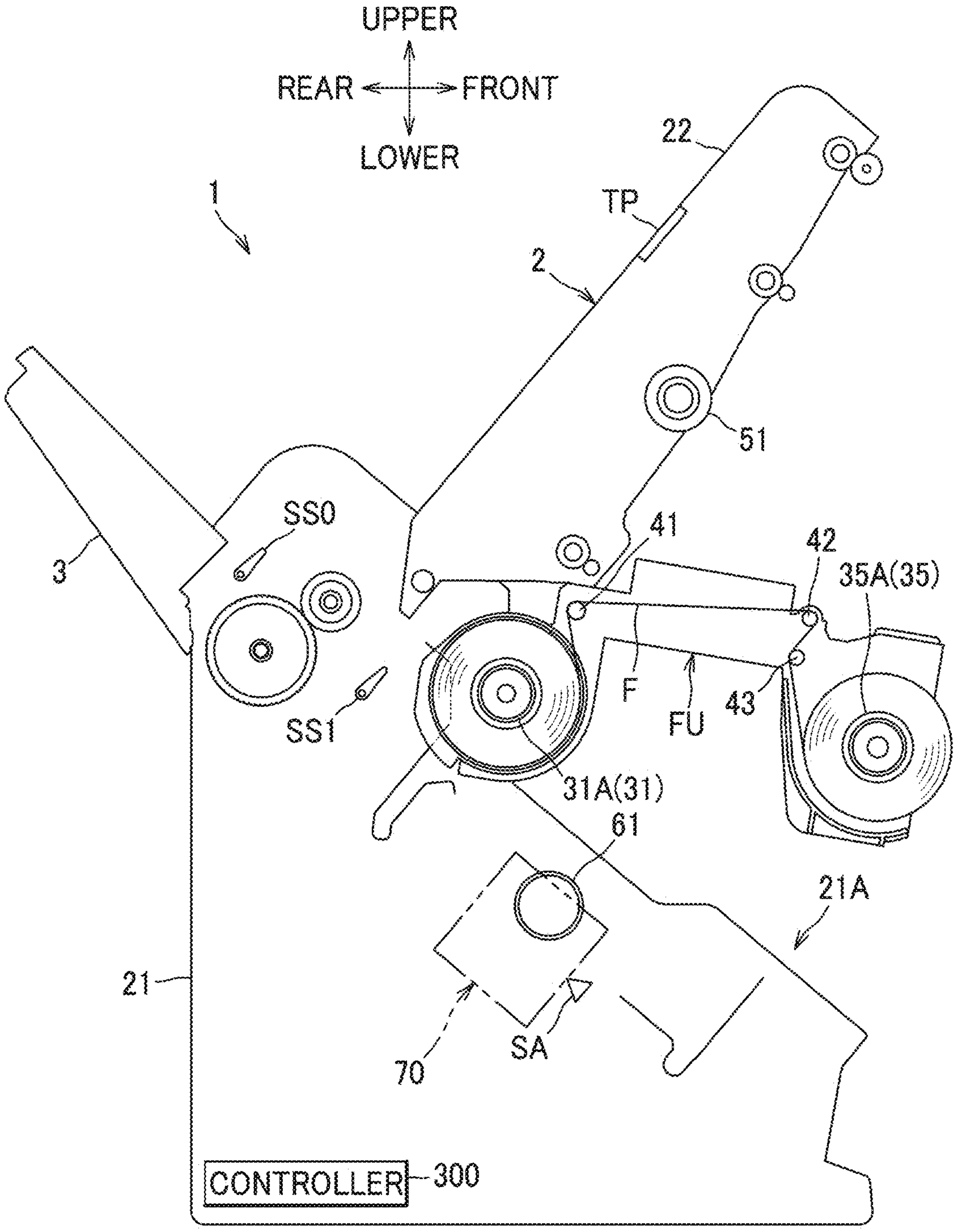
FIG. 2 is a schematic diagram showing an open cover state of the foil transfer device.

The film unit FU is configured, as shown in FIG. 2, to be installable into and removable from the housing main body 21 through the opening 21A along a direction perpendicular to an axial direction of a supply reel 31 which will be described later. The film unit FU includes a supply reel 31, a take-up reel 35, a first guide shaft 41, a second guide shaft 42, and a third guide shaft 43. A foil film F is wound on the supply reel 31 of the film unit FU.

Figure 1B:
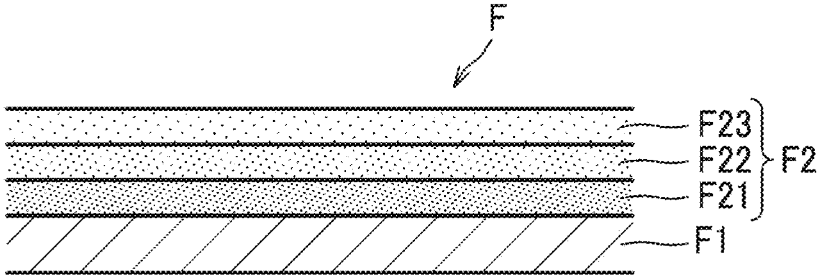
FIG. 1B is a section view showing a layer structure of a foil film.

As shown in FIG. 1B, the foil film F is a film made up of a plurality of layers. To be more specific, the foil film F includes a supporting layer F1 and a supported layer F2. The supporting layer F1 is a transparent substrate in the form of a tape and made of polymeric material, and supports the supported layer F2. The supported layer F2 includes several layers, such as a release layer F21, a transfer layer F22, and an adhesive layer F23. The release layer F21 is a layer for facilitating separation of the transfer layer F22 from the supporting layer F1, and is interposed between the supporting layer F1 and the transfer layer F22. The release layer F21 contains a transparent material, such as a wax-type resin, easily releasable from the supporting layer F1.

The transfer layer F22 is a layer to be transferred onto a toner image, and contains foil. Foil is a thin sheet of metal such as gold, silver, copper, aluminum, etc. The transfer layer F22 contains a colorant of gold-colored, silver-colored, red-colored, or other colored material, and a thermoplastic resin. The transfer layer F22 is interposed between the release layer F21 and the adhesive layer F23.

The adhesive layer F23 is a layer for facilitating adhesion of the transfer layer F22 to a toner image. The adhesive layer F23 contains a material, such as vinyl chloride resin, acrylic resin, etc., which tends to adhere to a toner image heated by the transfer unit 50 which will be described later.

The supply reel 31 is made of plastic or the like, and includes a supply shaft 31A on which a foil film F is wound. One end of the foil film F is fixed to the supply shaft 31A.

The take-up reel 35 is made of plastic or the like, and includes a take-up shaft 35A on which to take up the foil film F. The other end of the foil film F is fixed to the take-up shaft 35A.

It is to be understood that in FIG. 1 or other drawing figures, the supply reel 31 and the take-up reel 35 are illustrated as if the both reels were wound up to the maximum. In actuality, the film unit FU in new condition has its foil film F wound on the supply reel 31 in a roll of a maximum diameter, while no foil film F is wound on the take-up reel 35, or the foil film F is wound on the take-up reel 35 but in a roll of a minimum diameter. When the film unit FU is at the end of its life (i.e., the foil film F has been exhausted), the foil film F is wound on the take-up reel 35 in a roll of a maximum diameter, while no foil film F is wound on the supply reel 31, or the foil film F is wound on the supply reel 31 but in a roll of a minimum diameter.

Each of the first guide shaft 41, the second guide shaft 42, and the third guide shaft 43 is a shaft, made of SUS (stainless steel) or the like, for changing a direction of transport of the foil film F.

The first guide shaft 41 is located upstream of the transfer unit 50 in the direction of conveyance of the sheet S. The first guide shaft 41 changes a direction of transport of the foil film F drawn out from the supply reel 31 and guides the foil film F in a direction substantially parallel to the direction of conveyance of the sheet S.

The foil film F guided by the first guide shaft 41 is transported, with its supported layer F2 (see FIG. 1B) facing upward, toward the transfer unit 50. The sheet S is laid on the foil film F with its supported layer F2 facing upward, and is conveyed together with the foil film F toward the transfer unit 50.

The second guide shaft 42 is located downstream of the transfer unit 50 in the direction of conveyance of the sheet S. The second guide shaft 42 changes a direction of transport of the foil film F having passed through the transfer unit 50 into a direction different from the direction of conveyance of the sheet S, to thereby guide the foil film F in a direction away from the sheet S, so that the foil film F is peeled off from the sheet S.

The third guide shaft 43 defines an angle at which the foil film F is separated from the sheet S (hereinafter referred to as "peel angle"). Herein, the peel angle is an angle formed by a portion of the foil film F stretched between the second guide shaft 42 and the third guide shaft 43 with respect to a portion of the foil film F stretched between the first guide shaft 41 and the second guide shaft 42. The third guide shaft 43 changes a direction of transport of the foil film F guided by the second guide shaft 42 and guides the foil film F to the take-up reel 35.

The transfer unit 50 is a unit that heats and presses the sheet S and the foil film F laid on each other, to transfer the transfer layer F22 onto a toner image formed on a sheet S. The transfer unit 50 includes a pressure roller 51, a heating roller 61, and a nip/release mechanism 70. The transfer unit 50 applies heat and pressure to portions of a sheet S and a foil film F laid on each other and nipped between the pressure roller 51 and the heating roller 61.

The pressure roller 51 is a roller comprising a cylindrical metal core with its cylindrical surface coated with a rubber layer made of silicone rubber. The pressure roller 51 is located above the foil film F, and is contactable with a reverse side (opposite to a side on which a toner image is formed) of the sheet S.

The pressure roller 51 has two end portions supported rotatably by the cover 22. The pressure roller 51, which in combination with the heating roller 61, nips the sheet S and the foil film F, is driven to rotate and causes the heating roller 61 to rotate accordingly. In this way, the sheet S and the foil film F nipped between the pressure roller 51 and the heating roller 61 are conveyed according as the pressure roller 51 and the heating roller 61 rotate. In other words, the pressure roller 51 is configured to rotate, with the foil film F and the sheet S being nipped between the heating roller 61 and the pressure roller 51, to thereby cause the sheet S to move forward together with the foil film F drawn out from the supply reel 31 and guided by the first guide shaft 41. It is to be understood that the heating roller 61, instead of the pressure roller 51, may be configured to be driven to rotate and cause the pressure roller 51 to rotate accordingly.

The heating roller 61 is a roller comprising a cylindrical metal tube with a heater located inside, to heat the foil film F and the sheet S. The heating roller 61 is located under the foil film F, and is in contact with the foil film F.

The nip/release mechanism 70 is a mechanism configured to move a first roller that is one of the heating roller 61 an the pressure roller 51, relative to a second roller that is another of the heating roller 61 and the pressure roller 51, between a nipping position in which the first roller is pressed against the second roller, and a separate position in which the first roller is located apart from the second roller. In the present embodiment, the nip/release mechanism 70 causes the heating roller 61 to move between the nipping position indicated by a solid line in FIG. 1A and the separate position indicated by a phantom line in FIG. 1A, to thereby bring the heating roller 61 into and out of contact with the foil film F. Herein, the nipping position is a position in which the heating roller 61 is pressed against the pressure roller 51, and the separate position is a position in which the heating roller 61 is separated from the pressure roller 51.

With the foil transfer device 1 configured as described above, sheets S stacked on the sheet tray 3 with front surfaces facing downward are fed and conveyed one by one toward the transfer unit 50 by the sheet feed mechanism 11. Each sheet S is laid on a foil film F supplied from the supply reel 31 at a position upstream of the transfer unit 50 in the direction of conveyance of the sheet S, and conveyed to the transfer unit 50 with a toner image of the sheet S being kept in contact with the foil film F.

In the transfer unit 50, the sheet S and the foil film F nipped and passing through between the pressure roller 51 and the heating roller 61 are heated and pressed by the heating roller 61 and the pressure roller 51, so that the transfer layer F22, i.e., foil, is transferred onto a toner image. The position in which the sheet S and the foil film F are to be nipped between the pressure roller 51 and the heating roller 61 is called a transfer position.

After the foil transfer is complete, the sheet S and the foil film F adhered to each other are conveyed to the second guide shaft 42. When the sheet S and the foil film F travels past the second guide shaft 42, the direction of transport of the foil film F is changed into a direction different from the direction of conveyance of the sheet S; thereby the foil film F is peeled from the sheet S.

The foil film F peeled from the sheet S is taken up on the take-up reel 35. On the other hand, the sheet S from which the foil film F is peeled has a foil transferred surface facing downward and is ejected to the outside of the housing 2 by the sheet ejection mechanism 12.

Figure 3:
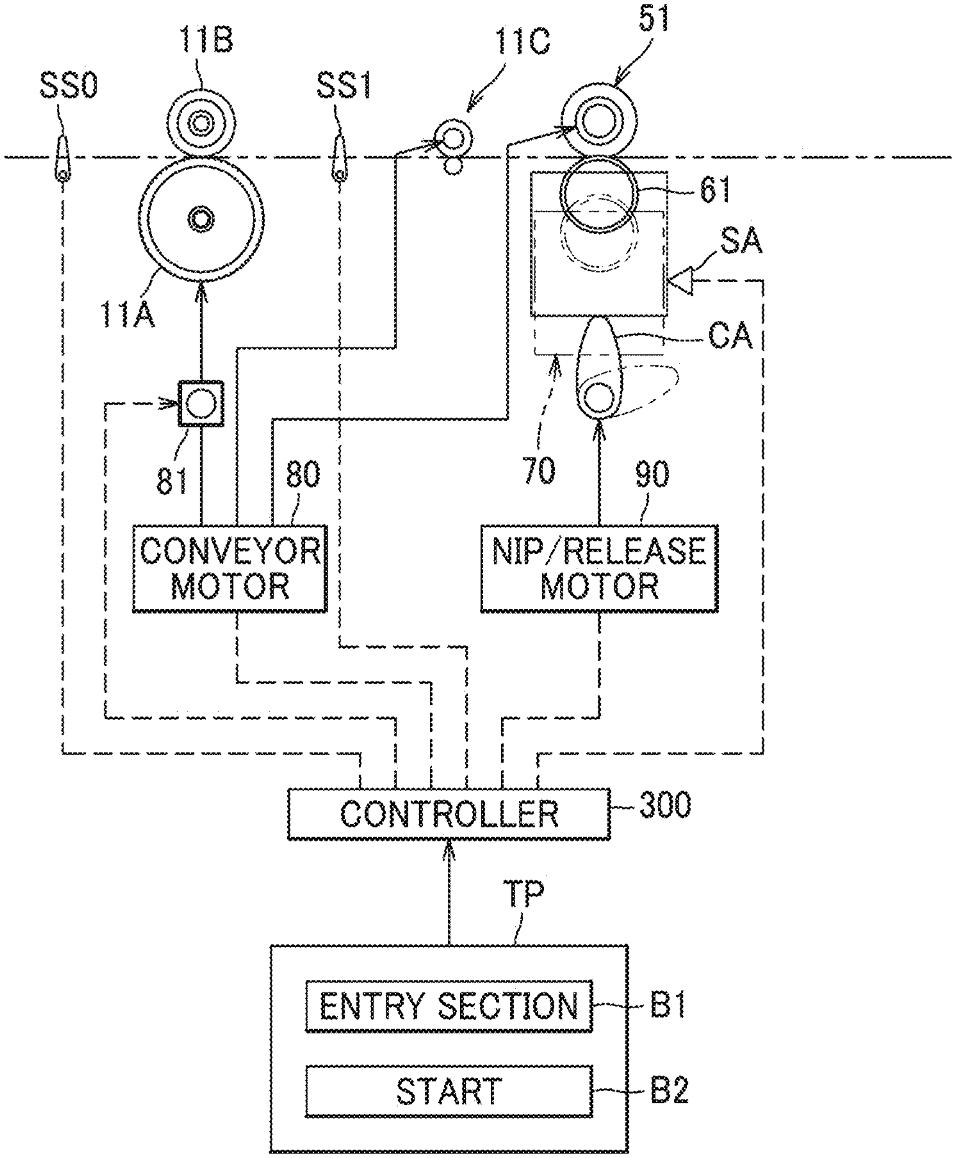
FIG. 3 is a connection diagram of a controller, sensors, motors, and a touch panel.

As shown in FIG. 3, the foil transfer device 1 further includes a conveyor motor 80, a clutch 81, a nip/release motor 90, a cam CA, a separation sensor SA, a controller 300, and a touch panel TP.

The conveyor motor 80 is a motor that generates mechanical power to drive the pickup roller 11A, the retard roller 11B, the upstream conveyor roller 11C, and the pressure roller 51. The pickup roller 11A receives the mechanical power via the clutch 81 from the conveyor motor 80.

The nip/release motor 90 is a motor that generates mechanical power to drive the cam CA as an actuator of the nip/release mechanism 70 to move the heating roller 61 between the nipping position and the separate position, specifically, by moving a frame on which the heating roller 61 is rotatably supported. Supposing the heating roller 61 is positioned in the separate position and the nip/release mechanism 70 receives the mechanical power from the nip/release motor 90, the cam CA is activated to rotate, pushing up the frame supporting the heating roller 61 to move the heating roller 61 from the separate position toward the nipping position. The frame supporting the heating roller 61 is locked in place by the cam CA while the heating roller 61 is positioned in the nipping position. Supposing the heating roller 61 is positioned in the nipping position and the nip/release mechanism 70 receives the mechanical power from the nip/release motor 90, the cam CA is activated to rotate, releasing and letting the frame move down together with the heating roller 61 under their own weights so that the heating roller 61 moves from the nipping position to the separate position.

The separation sensor SA is a sensor that detects a position of the heating roller 61. To be more specific, the separation sensor SA detects the frame supporting the heating roller 61, and outputs an ON signal when the heating roller 61 is positioned in the separate position, and outputs an OFF signal when the heating roller 61 is not positioned in the separate position. The separation sensor SA is, for example, an optical sensor, and provided near the nip/release mechanism 70.

A sheet sensor SS1 is provided between the pickup roller 11A and the upstream conveyor roller 11C. The sheet sensor SS1 is a sensor located in a position upstream of the heating roller 61 along a path of conveyance of the sheet S to detect the sheet S. The sheet sensor SS1 is capable of detecting a leading edge and a trailing edge of the sheet S moving past the sheet sensor SS1. For example, the sheet sensor SS1 may be configured to comprise a lever and an optical sensor. When a sheet S comes in contact with the lever, the lever pivots, and the optical sensor detects the position of the lever. The leading edge of the sheet S in this description refers to a front end of the sheet S moving forward in the direction of conveyance of the sheet S.

The controller 300 includes a central processing unit (CPU), a random-access memory (RAM), a read-only memory (ROM), and an input/output processor circuit. The controller 300 executes processes of control by performing a variety of computations and operations based on programs and data stored in the ROM, etc.

The touch panel TP is a panel that displays buttons or the like to be touched by a user for giving instructions on operation or a choice from options, to the controller 300. The touch panel TP is provided, for example, on a top surface of the cover 22 as shown in FIG. 1.

As shown in FIG. 3, the touch panel TP is configured to display an entry section B1 and a start button B2. The entry section B1 comprises a plurality of buttons for changing numeric values and other data shown in the touch panel TP. The start button B2 is a button for starting execution of the foil transfer process.

The controller 300 is configured to be capable of executing a foil transfer process in an entire area transfer mode and in a foil save mode. In the entire area transfer mode, foil is transferred entirely on a surface of a sheet S by causing the foil film F to be pressed against an entire area of the surface (entire surface region) of the sheet S. In the foil save mode, foil is transferred partially on the surface of the sheet by causing the foil film F to be pressed against a confined surface region (part of the entire area of the surface of the sheet S) as defined by front and rear boundaries thereof on the sheet S in the conveyance direction. The foil transfer device 1 may be configured to offer an option to transfer foil partially on a laterally confined area of the surface of a sheet S by causing the foil film to be pressed, not against an entire surface region, but against a confined surface region as defined by left and right boundaries thereof on the sheet being conveyed in the conveyance direction. This option may be available for the foil transfer process both in the foil save mode and in the entire area transfer mode. That is, in the entire area transfer mode, foil may not necessarily be transferred entirely in the strict sense of the term, but may be transferred partially on a laterally confined area, extending throughout the length in the conveyance direction, of the surface of a sheet S.

A user who executes a foil transfer process in the foil save mode may manipulate the buttons provided in the entry section B1 to make settings for operation in the foil save mode. To be more specific, the settings may include a forward margin length L1 that is a length measured from the leading edge of the sheet S to a front boundary of the foil transfer area TA (from which foil transfer is to be started), and a foil transfer length LT that is a length of the foil transfer area TA (area in which foil is to be transferred) in the conveyance direction.

The controller 300 determines a surface region, against which the foil film F is to be pressed by the heating roller 61, on the sheet S, as an area covering a foil transfer area TA on which foil is to be transferred, based on the transfer mode and values specified by a user. To be more specific, the controller 300 determines a period of time that has elapsed from a time of detection of a leading edge of a sheet S by the sheet sensor SS1 to a time of causing the heating roller 61 to start moving from the separate position toward the nipping position, and a period of time that has elapsed from a predetermined time to a time of causing the heating roller 61 to start moving from the nipping position toward the separate position. It is to be understood that the predetermined time may vary according to the transfer mode, and may be a time such as a time at which the conveyor motor 80 is turned on, a time of detection of a trailing edge of a sheet S, a time at which the output signal from the separation sensor SA turns OFF, etc.

Figure 4A:
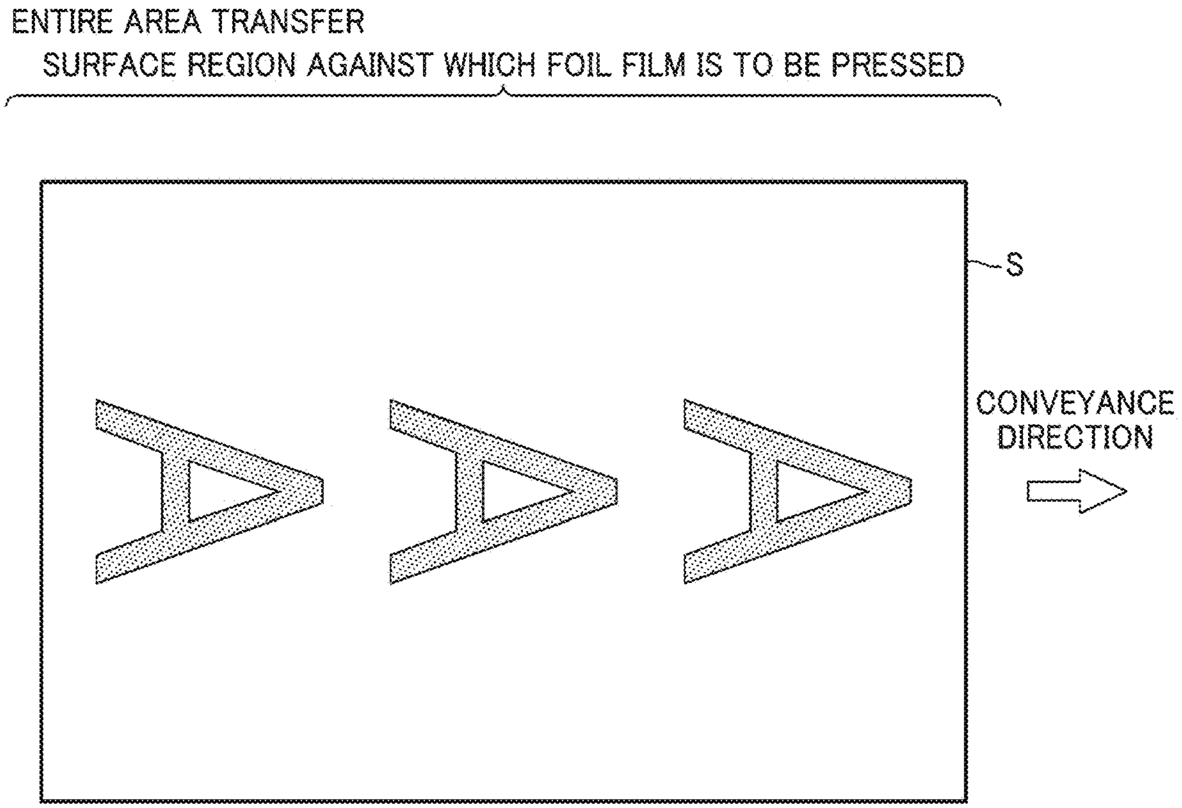
FIG. 4A is a diagram showing boundaries of a surface region defined on a surface of a sheet against which foil film is to be pressed, for an entire area transfer process.

As shown in FIG. 4A, when the entire area transfer mode is selected, neither the forward margin length L1 nor the foil transfer length LT is specified. The controller 300 thus executes a foil transfer process in the entire area transfer mode in which the foil film F is pressed against an entire surface region of the sheet S.

Figure 4B:
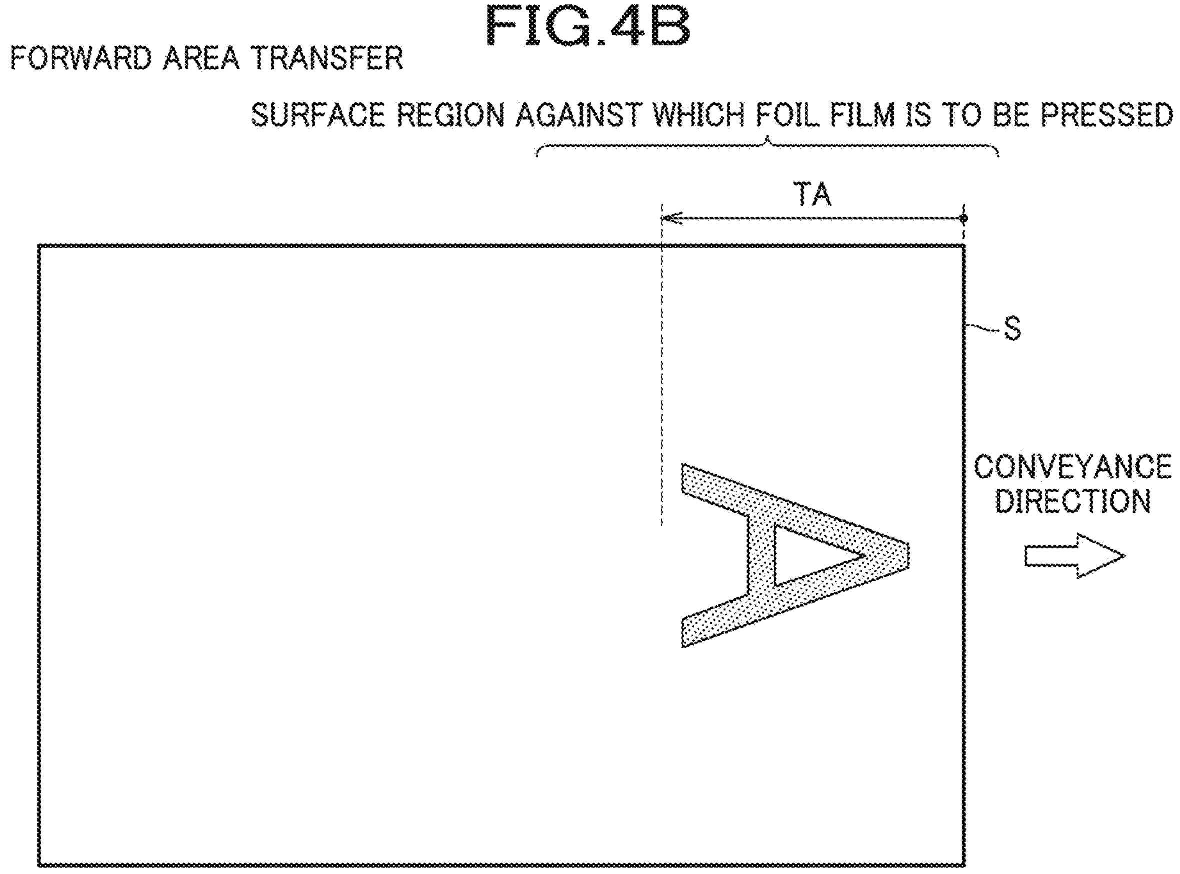
FIG. 4B is a diagram showing boundaries of a foil transfer area and a surface region defined on a surface of a sheet against which foil film is to be pressed, for a forward area transfer process.
Figure 5A:
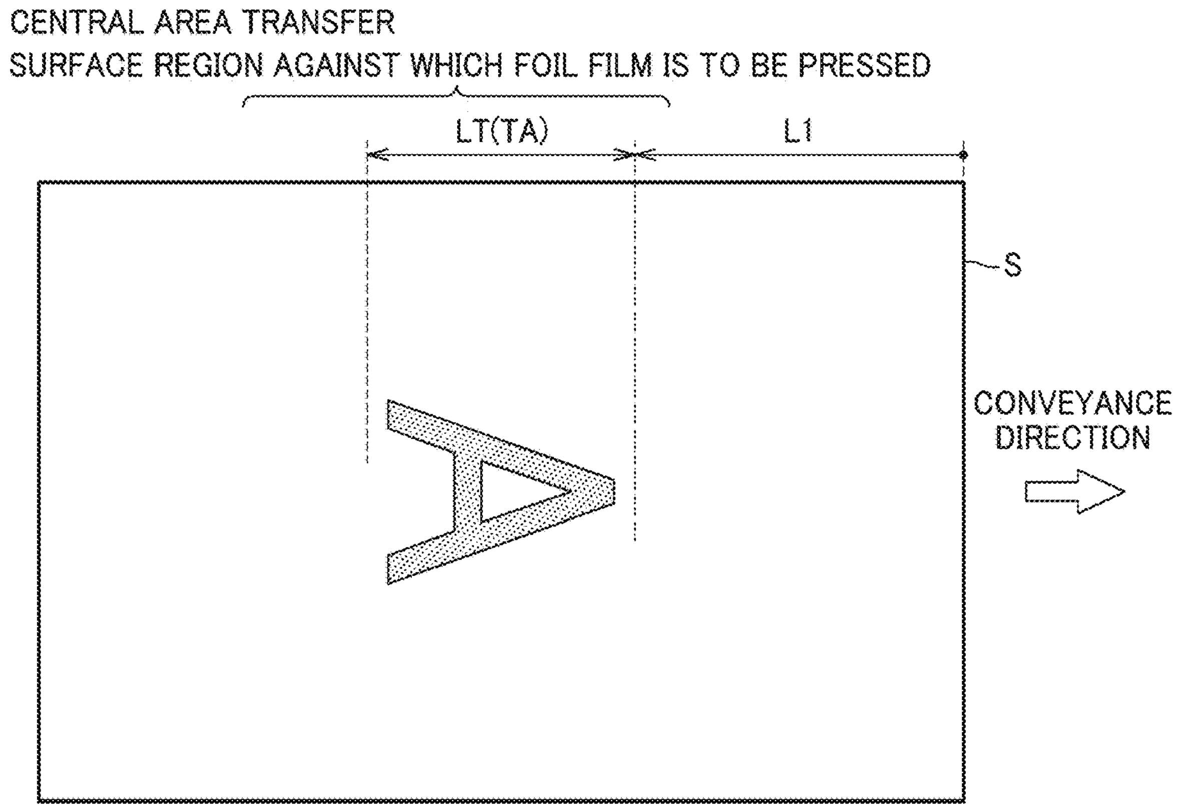
FIG. 5A is a diagram showing boundaries of a foil transfer area and a surface region defined on a surface of a sheet against which foil film is to be pressed, for a central area transfer process.
Figure 5B:
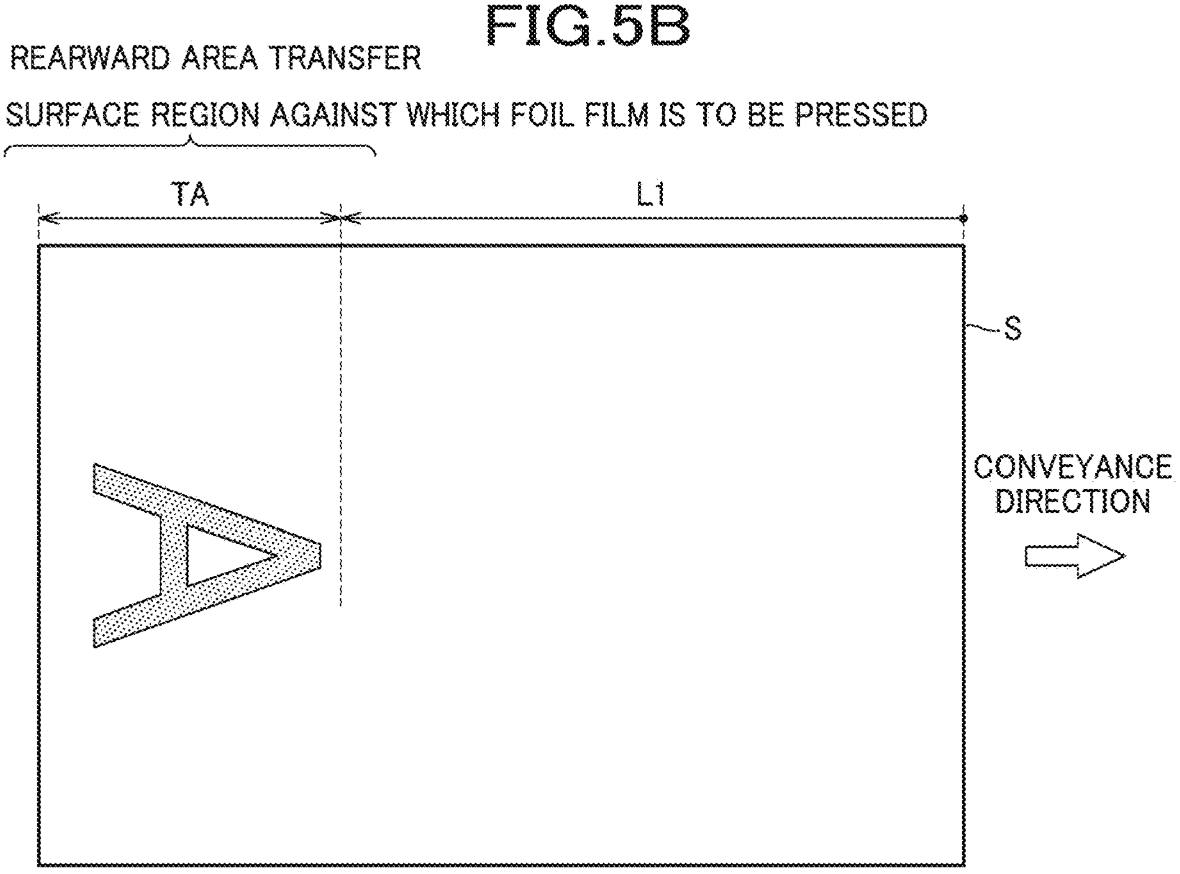
FIG. 5B is a diagram showing boundaries of a foil transfer area and a surface region defined on a surface of a sheet against which foil film is to be pressed, for a rearward area transfer process.

The foil save mode includes a forward area transfer mode as shown in FIG. 4B, a central area transfer mode as shown in FIG. 5A, and a rearward area transfer mode as shown in FIG. 5B. The controller 300 executes a foil transfer process in the foil save mode in which foil is transferred partially on the surface of the sheet S by causing the foil film F to be pressed against a confined surface region (part of a surface region on the sheet S) as defined by front and rear boundaries thereof on the sheet S in the conveyance direction.

As shown in FIG. 4B, when the forward area transfer mode is specified, a user specifies the foil transfer length LT without specifying the forward margin length L1. In the forward area transfer mode, the confined surface region having a front boundary located at the leading edge of the sheet S and a rear boundary located at a distance of the user-specified foil transfer length LT from the leading edge is set for a surface region against which the foil film F is to be pressed and which includes the foil transfer area TA.

As shown in FIG. 5A, when the central area transfer mode is specified, the user specifies the forward margin length L1 and the foil transfer length LT. In the central area transfer mode, the confined surface region having a front boundary located at a distance of the user-specified forward margin length L1 from the leading edge of the sheet S and a rear boundary located at a distance of the user-specified foil transfer length LT from the front boundary is set for a surface region against which the foil film F is to be pressed and which includes the foil transfer area TA.

As shown in FIG. 5B, when the rearward area transfer mode is specified, a user specifies the forward margin length L1 without specifying the foil transfer length LT. In the rearward area transfer mode, the confined surface region having a front boundary located at a distance of the user-specified forward margin length L1 from the leading edge of the sheet S and a rear boundary located at the trailing edge of the sheet S is set for the foil transfer area TA.

When a user specifies a transfer mode and other information, and presses or touches the start button B, the touch panel TP outputs a relevant instruction programed according to the specified mode and information on the foil transfer area TA, to the controller 300. In the following description, an instruction which is to be outputted to the controller 300 when the entire area transfer mode is specified will be referred to as "entire area transfer instruction"; an instruction which is to be outputted to the controller 300 when the forward area transfer mode is specified will be referred to as "forward area transfer instruction"; an instruction which is to be outputted to the controller 300 when the rearward area transfer mode is specified will be referred to as "rearward area transfer instruction"; and an instruction which is to be outputted to the controller 300 when the central area transfer mode is specified will be referred to as "central area transfer instruction".

Upon receipt of an instruction for execution of a foil transfer process in each transfer mode, the heating roller 61 is positioned in the separate position, and the controller 300 causes the pickup roller 11A to be powered via the clutch 81, to operate so that a sheet S placed on the sheet tray 3 is fed toward the transfer unit 50. Thereafter, the controller 300 executes process steps according to the specified transfer mode.

The process steps the controller 300 is configured to execute according to each of the transfer modes will be described below. It is to be understood that in an initial state under which the foil transfer process is not executed, the heating roller 61 is positioned in the separate position and the separation sensor SA is outputting an ON signal.

The initial steps executed by the controller 300 in response to the operation of a user touching the start button B2 are common among the respective transfer modes, and include activating the conveyor motor 80 and causing the sheet feed mechanism 11 to pick up and feed a sheet S to the transfer unit 50. Thereafter, the controller 300 causes the sheet feed mechanism 11 to stop conveyance of the sheet S before the leading edge of the first sheet S reaches the transfer position. The controller 300 then starts causing the heating roller 61 to be moved from the separate position toward the nipping position.

Hereupon, when the foil transfer process is executed in the entire area transfer mode or the forward area transfer mode, the controller 300 causes the sheet feed mechanism 11 to start conveyance of a sheet S for executing the foil transfer process on or after a time at which the heating roller 61 reaches the nipping position.

On the other hand, when the foil transfer process is executed in the central area transfer mode or the rearward area transfer mode, i.e., the nip/release mechanism 70 starts causing the foil film F to be pressed against a confined surface region on a sheet S, of which a front boundary is located apart from a leading edge of the sheet S, the controller 300 causes the sheet feed mechanism 11 to start conveyance of a sheet S for executing the foil transfer process before the heating roller 61 reaches the nipping position. To be more specific, when the foil transfer process is executed in the central area transfer mode or the rearward area transfer mode, the controller 300 executes a first process, a second process, a third process, and a fourth process.

The first process is a process, executed by the controller 300, of causing the upstream conveyor roller 11C to start conveyance of the sheet S, while the heating roller 61 is positioned in the separate position.

The second process is a process, executed by the controller 300, of causing the upstream conveyor roller 11C to stop conveyance of the sheet S before the foil transfer area TA defined on a surface of the sheet S reaches the transfer position in which the foil film F and the sheet S are to be nipped between the pressure roller 51 and the heating roller 61 in the nipping position. In the second process, the controller 300 determines a time of stopping conveyance of the sheet S, based on a period of time that has elapsed from a time of detection of the leading edge of the sheet S by the sheet sensor SS1. The controller 300 stops conveyance of the sheet S at a time when a time period T11 has elapsed from the time of detection of the leading edge of the sheet S by the sheet sensor SS1. The time period T11 is a period of time, as determined according to the forward margin length L1 specified by a user, such that the sheet S can be stopped just before the foil transfer area TA thereof reaches the transfer position.

The third process is a process, executed by the controller 300, of causing the nip/release mechanism 70 to start moving the heating roller 61 from the separate position to the nipping position while the conveyance of the sheet S is stopped.

The fourth process is a process, executed by the controller 300, of causing the upstream conveyor roller 11C to restart conveyance of the sheet S before the heating roller 61 reaches the nipping position. In this example, the conveyance of the sheet S is restarted in the fourth process after the heating roller 61 and the pressure roller 51 are caused to be positioned in contact with the foil film F or the sheet S. In the fourth process, the controller 300 determines a time of restarting the conveyance of the sheet S based on a signal from the separation sensor SA. The controller 300 restarts the conveyance of the sheet S at a time when a time period T22 has elapsed from a time of change of the signal outputted from the separation sensor SA, from ON to OFF.

Next, one example of an operation of the controller 300 will be described with reference to the flowchart shown in FIG. 6. After power-on of the foil transfer device 1, the controller 300 repeatedly executes a process shown in FIG. 6.

Figure 6:
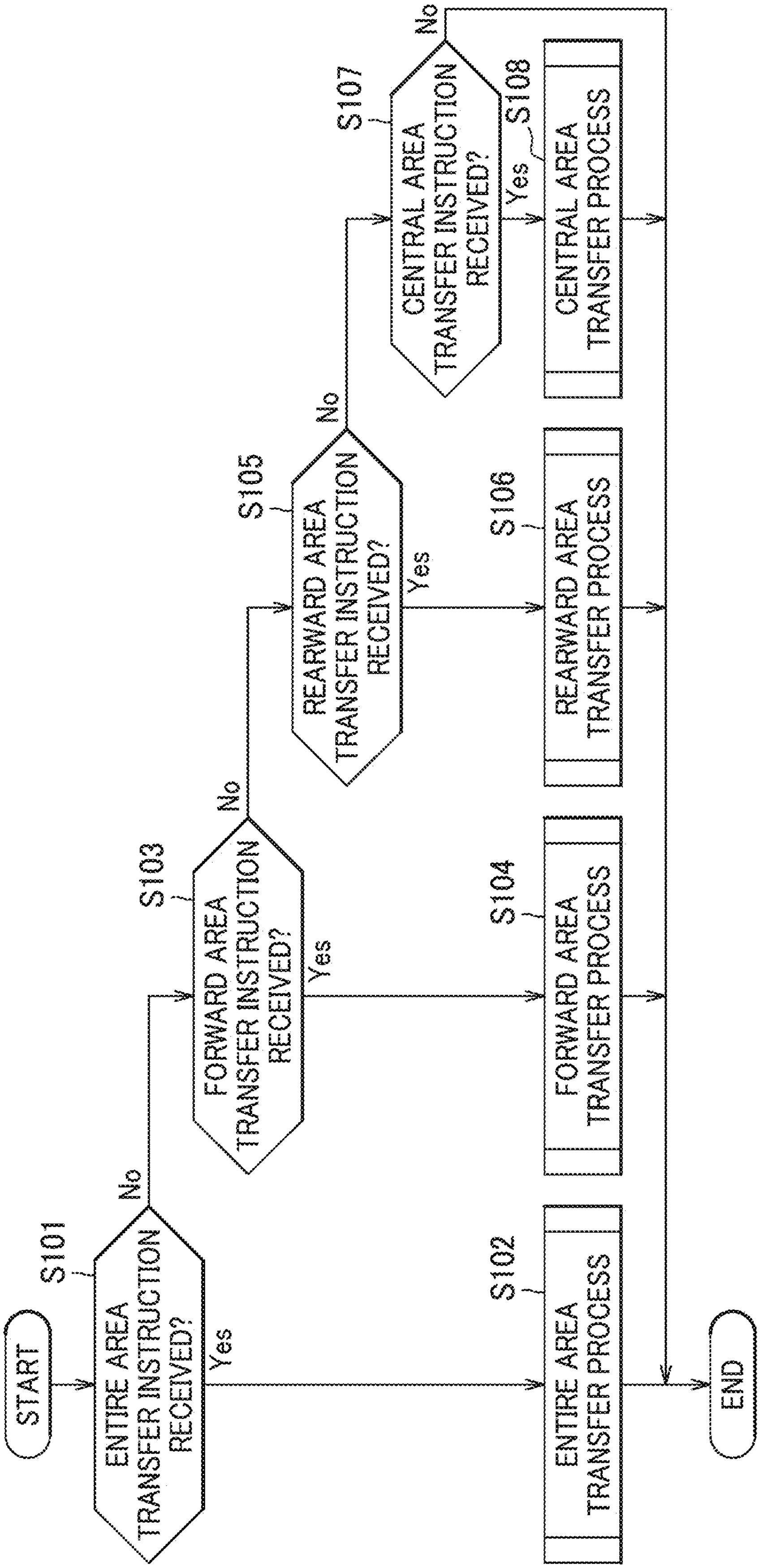
FIG. 6 is a flowchart showing a process of operation which the controller executes upon receipt of an entire area transfer instruction, a forward area transfer instruction, a rearward area transfer instruction, and a central area transfer instruction.

As shown in FIG. 6, the controller 300 makes a determination as to whether or not an entire area transfer instruction has been received (S101). If it turns out in step S101 that an entire area transfer instruction has been received (Yes), then the controller 300 proceeds to execute an entire area transfer process (S102), and brings this round of the process to an end.

If it turns out in step S101 that an entire area transfer instruction has not been received (No), then the controller 300 makes a determination as to whether or not a forward area transfer instruction has been received (S103). If it turns out in step S103 that a forward area transfer instruction has been received (Yes), then the controller 300 proceeds to execute a forward area transfer process (S104), and brings this round of the process to an end.

If it turns out in step S103 that a forward area transfer instruction has not been received (No), then the controller 300 makes a determination as to whether or not a rearward area transfer instruction has been received (S105). If it turns out in step S105 that a rearward area transfer instruction has been received (Yes), then the controller 300 proceeds to execute a rearward area transfer process (S106), and brings this round of the process to an end.

If it turns out in step S105 that a rearward area transfer instruction has not been received (No), then the controller 300 makes a determination as to whether or not a central area transfer instruction has been received (S107). If it turns out in step S107 that a central area transfer instruction has been received (Yes), then the controller 300 proceeds to execute a central area transfer process (S108), and brings this round of the process to an end. If it turns out in step S107 that a central area transfer instruction has not been received (No), then the controller 300 brings this round of the process to an end.

Figure 10:
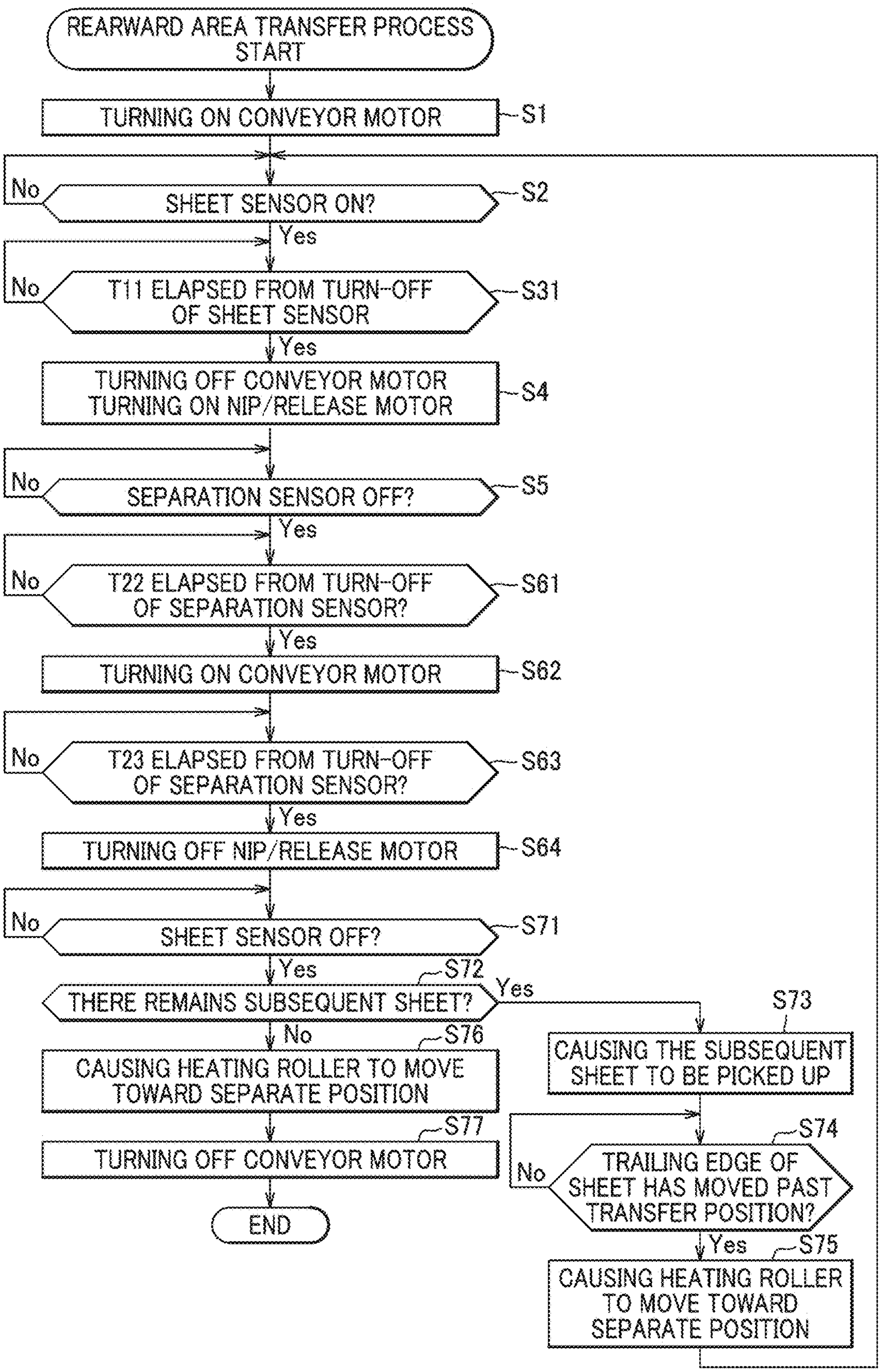
FIG. 10 is a flowchart showing the rearward area transfer process.
Figure 11:
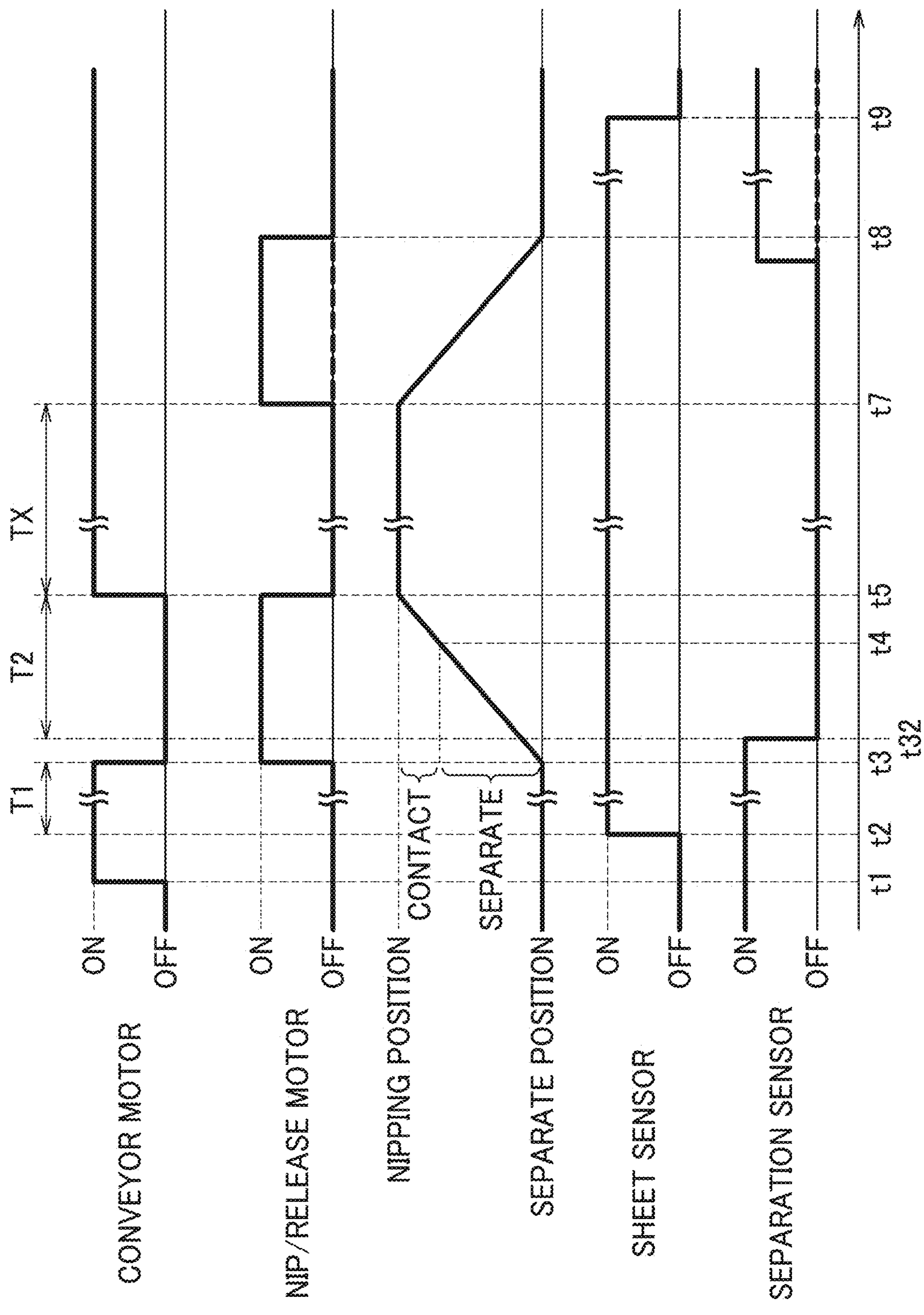
FIG. 11 is a timing chart for explaining timing control exercised in the entire area transfer process or the forward area transfer process.

A description will be given of illustrative examples of the forward area transfer process, the entire area transfer process, the central area transfer process, and the rearward area transfer process, as executed by the controller 300, with reference to the flowcharts shown in FIGS. 7, 8, 9, and 10 and the timing chart shown in FIGS. 11 and 12.

First, one example of the forward area transfer process as executed by the controller 300 will be described in detail with reference to the flowchart shown in FIG. 7 and the timing chart shown in FIG. 11. FIG. 11 shows operations of relevant parts of the foil transfer device 1 which proceed in the entire area transfer process or the forward area transfer process under control of the controller 300. In FIG. 11, the solid lines indicate the forward area transfer process, and the broken lines indicate characteristic sections in the entire area transfer process distinct from the forward area transfer process.

Figure 7:
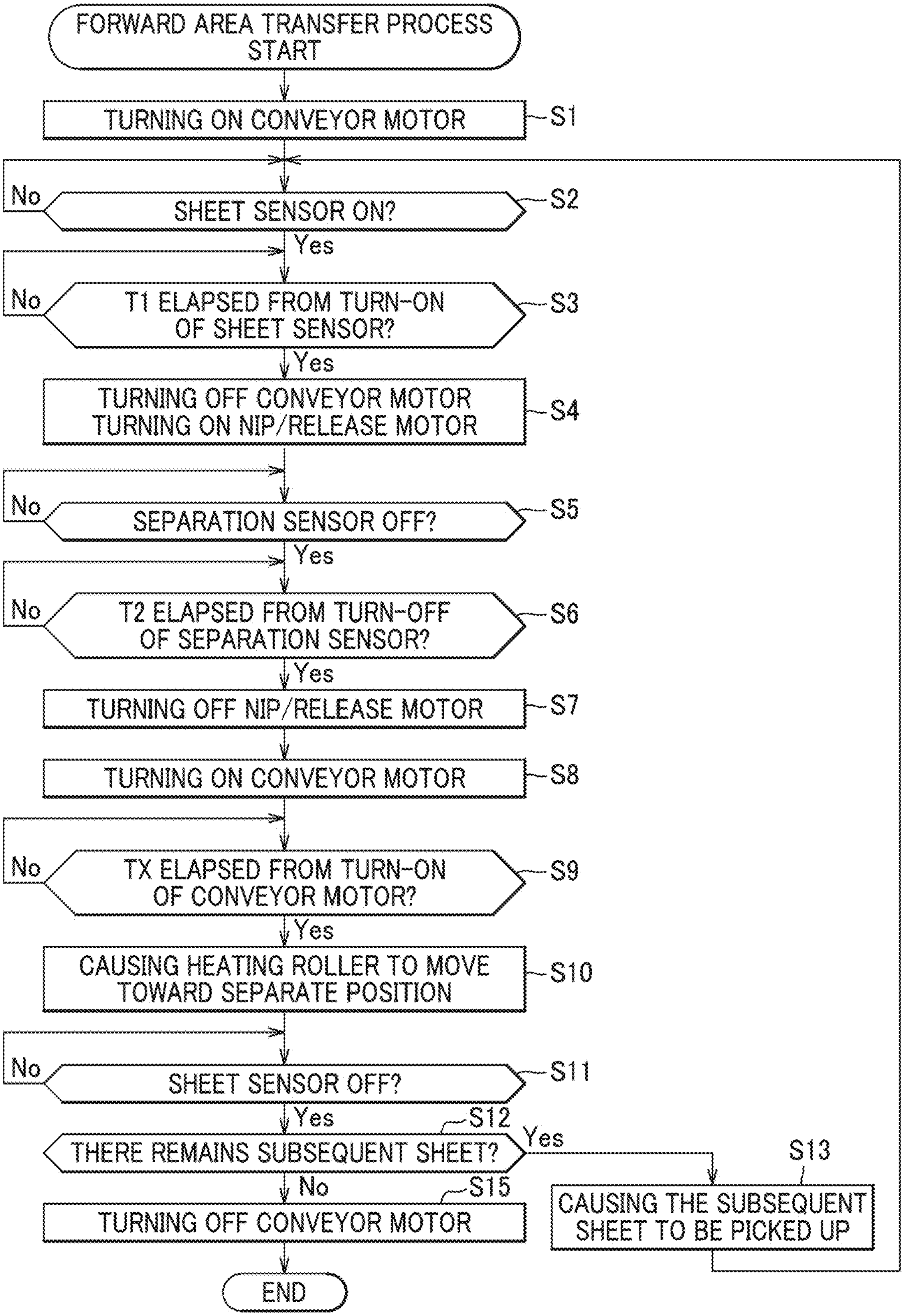
FIG. 7 is a flowchart showing the forward area transfer process.

In the forward area transfer process shown in FIG. 7, the controller 300 turns on the conveyor motor 80 (S1, t1), and makes a determination as to whether or not the sheet sensor SS1 has been turned on (S2).

In step S2, the controller 300 waits until the sheet sensor SS1 is turned on, and if it turns out that the sheet sensor SS1 has been turned on (Yes in step S2, t2), then makes a determination as to whether or not a time period T1 has elapsed from a time at which the sheet sensor SS1 has been turned on (S3).

If it turns out in step S3 that the time period T1 has elapsed from the time at which the sheet sensor SS1 has been turned on (Yes in step S3, t3), the controller 300 makes a determination that a leading edge of the sheet S has reached a position short of the transfer position, and thus turns off the conveyor motor 80, and turns on the nip/release motor 90 (S4, t3). Accordingly, the heating roller 61 is caused to start moving from the separate position toward the nipping position by the nip/release mechanism 70 while the conveyance of the sheet S is stopped. The time period T1 is a period of time such that the sheet S can be stopped just before the leading edge of the sheet S reaches the transfer position.

After step S4, the controller 300 makes a determination as to whether or not the separation sensor SA is turned off (S5). The controller 300 waits until the separation sensor SA is turned off, and if it turns out that the separation sensor SA has been turned off (Yes in step S5, t32), then makes a determination as to whether or not a time period T2 has elapsed from a time at which the separation sensor SA has been turned off (S6). The time period T2 is a period of time required for the heating roller 61 to move from the separate position to the nipping position, i.e., a period of time it takes from a time at which the separation sensor SA has been turned off to a time at which the heating roller 61 reaches the nipping position.

In step S6, when the controller 300 having waited the time period T2 since it turns out that the separation sensor SA has been turned off determines that the time period T2 has elapsed from the time at which the separation sensor SA has been turned off (Yes in step S6, t5), the controller 300 turns off the nip/release motor 90 (S7, t5), and turns on the conveyor motor 80 (S8, t5) to restart conveyance of the sheet S.

After step S8, the controller 300 makes a determination as to whether or not a predetermined period TX has elapsed from a time at which the conveyor motor 80 has been turned on (S9). The predetermined period TX is a period of time, as determined according to the foil transfer length LT specified by a user, i.e., a period sufficient to transfer foil on the foil transfer area TA in its entirety.

In step S9, when the controller 300 having waited the predetermined period TX since the conveyor motor 80 has been turned on determines that the predetermined period TX has elapsed from the time at which the conveyor motor 80 has been turned on (Yes in step S9, t7), the controller 300 turns on the nip/release motor 90 to cause the heating roller 91 to move toward the separate position (S10, t7), and makes a determination as to whether or not the seat sensor SS1 has been turned off (S11).

In step S11, when the controller 300 having waited until the sheet sensor SS1 has been turned off has determined that the sheet sensor SS1 has been turned off (Yes in step S11, t9), then makes a determination as to whether or not there remains a subsequent sheet S to be subjected to the foil transfer process (S12). It is to be understood that the determination made by the controller 300 as to whether or not there remains a subsequent sheet S may be based on the output of the sheet tray sensor SS0. For example, if the sheet tray sensor SS0 is outputting an ON signal, it is determined that there remains a subsequent sheet S.

If it turns out in step S12 that there remains a subsequent sheet S (Yes in step S12), then the controller 300 causes the subsequent sheet S to be picked up (S13) and goes to step S2. On the other hand, if it turns out in step S12 that there remains no subsequent sheet S (No in step S12), then the controller 300 causes the heating roller 61 to be moved to the separate position, turns off the conveyor motor 80 (S15), and brings the forward area transfer process to an end.

Next, one example of the entire area transfer process as executed by the controller 300 will be described in detail with reference to the flowchart shown in FIG. 8 and the timing chart shown in FIG. 11. The entire area transfer process is different only in part of a post-transfer process from the forward area transfer process, and the other part of process steps (i.e., steps S1 to S8) is substantially the same as that of the forward area transfer process, and a duplicate description thereof will be omitted.

Figure 8:
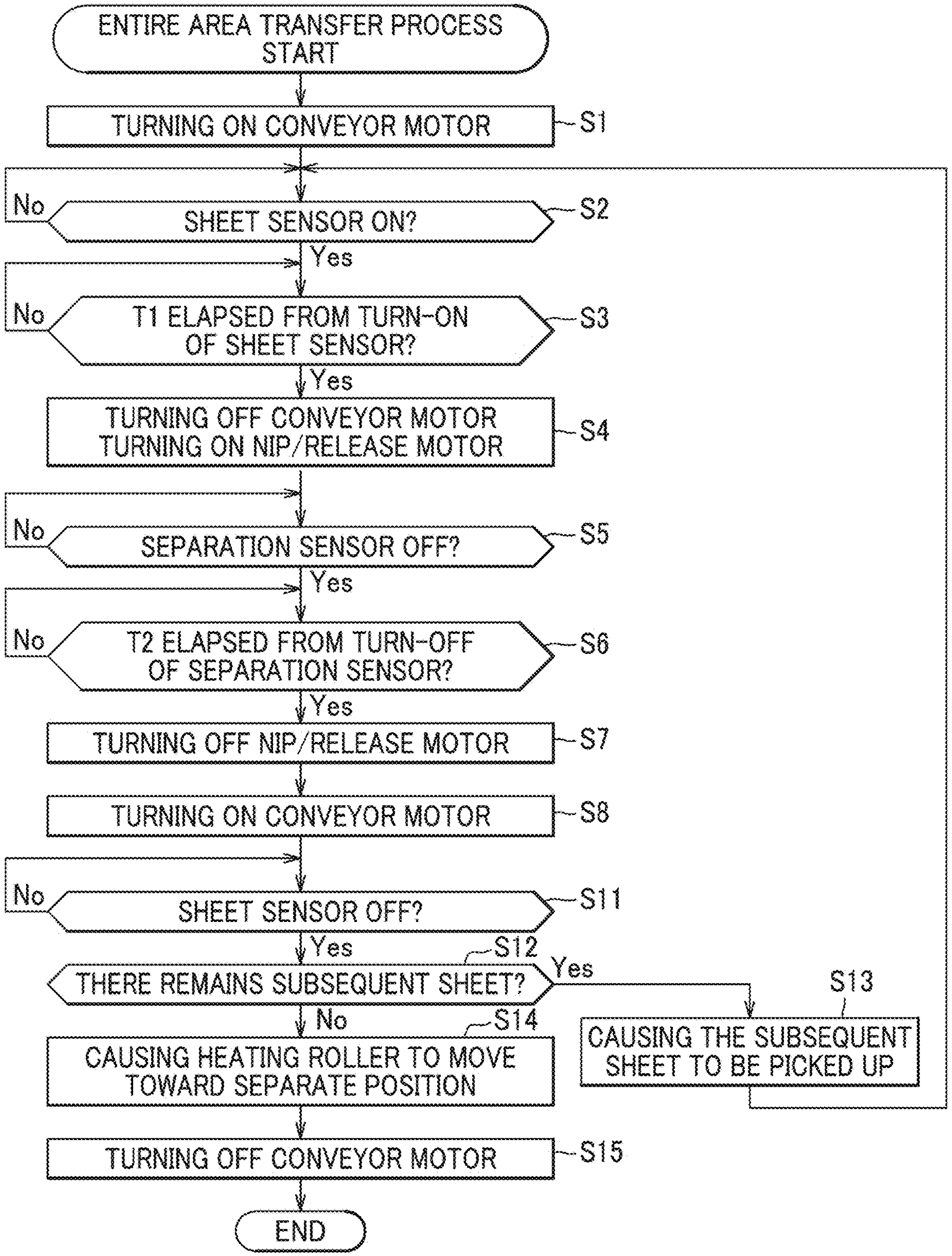
FIG. 8 is a flowchart showing the entire area transfer process.

In the entire area transfer process as shown in FIG. 8, the controller 300 turns on the conveyor motor 80 (S8, t5) to restart conveyance of the sheet S, and then makes a determination as to whether or not the sheet sensor SS1 has been turned off (S11).

In step S11, when the controller 300 having waited until the sheet sensor SS1 has been turned off has determined that the sheet sensor SS1 has been turned off (Yes in step S11, t9), then makes a determination as to whether or not there remains a subsequent sheet S to be subjected to the foil transfer process (S12).

If it turns out in step S12 that there remains a subsequent sheet S (Yes in step S12), then the controller 300 causes the subsequent sheet S to be picked up (S13) and goes to step S11. On the other hand, if it turns out in step S12 that there remains no subsequent sheet S (No in step S12), then the controller 300 causes the heating roller 91 to move toward the separate position (S14), and thereafter turns off the conveyor motor 80 (S15), and brings the entire area transfer process to an end.

Next, one example of the central area transfer process as executed by the controller 300 will be described in detail with reference to the flowchart shown in FIG. 9 and the timing chart shown in FIG. 12. FIG. 12 shows operations of relevant parts of the foil transfer device 1 which proceed in the central area transfer process or the rearward area transfer process under control of the controller 300. In FIG. 12, the solid lines indicate the central area transfer process, and the broken lines indicate characteristic sections in the rearward area transfer process distinct from the central area transfer process.

Figure 9:
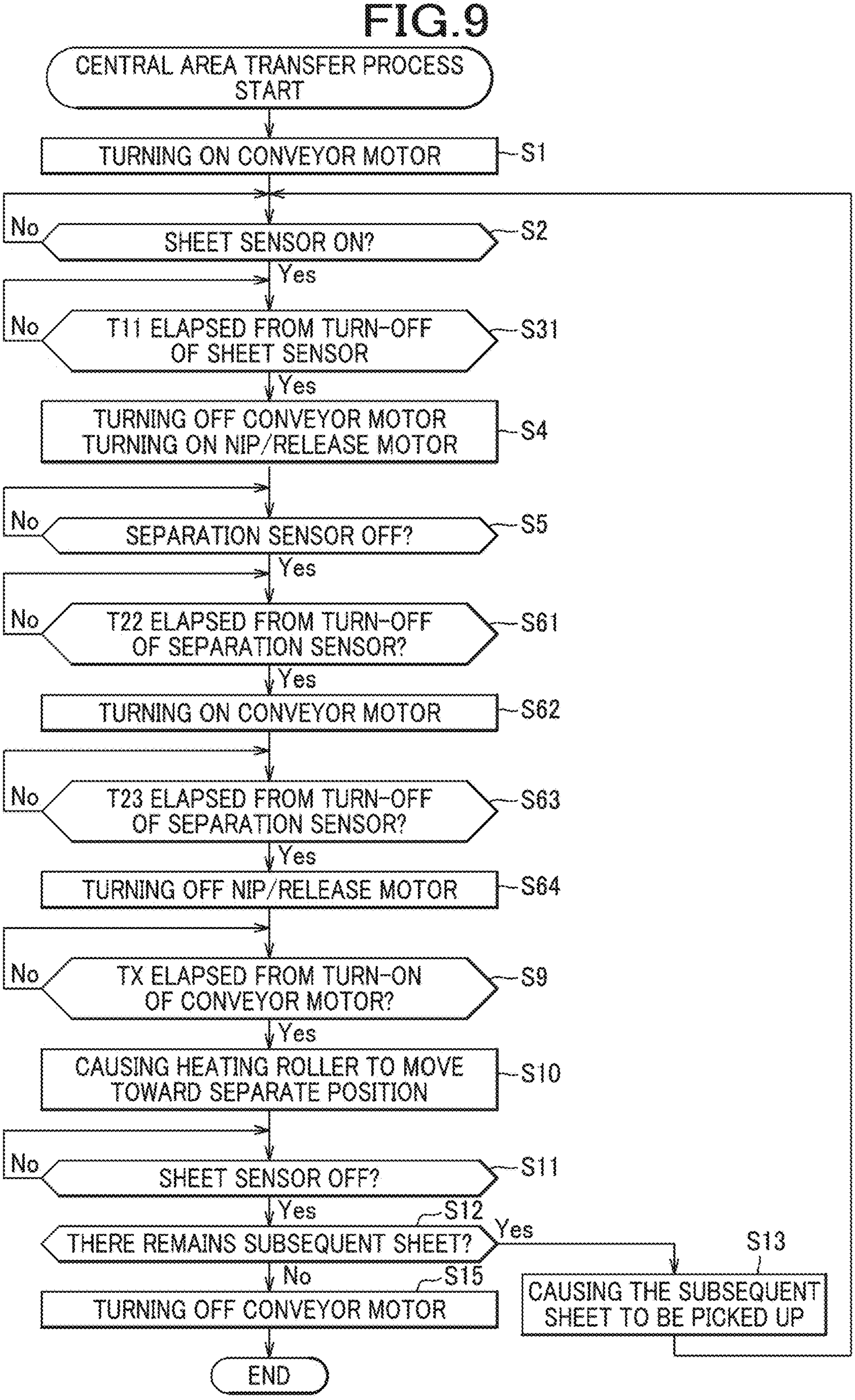
FIG. 9 is a flowchart showing the central area transfer process.

In the central area transfer process shown in FIG. 9, the controller 300 turns on the conveyor motor 80 (S1, t1), and makes a determination as to whether or not the sheet sensor SS1 has been turned on (S2).

In step S2, the controller 300 waits until the sheet sensor SS1 is turned on, and if it turns out that the sheet sensor SS1 has been turned on (Yes in step S2, t2), then makes a determination as to whether or not a time period T11 has elapsed from a time at which the sheet sensor SS1 has been turned on (S31). The time period T11 is, as mentioned above, a period of time as determined according to the forward margin length L1 specified by a user, such that the sheet S can be stopped just before the foil transfer area TA thereof reaches the transfer position.

If it turns out in step S31 that the time period T11 has elapsed from the time at which the sheet sensor SS1 has been turned on (Yes in step S31, t31), the controller 300 makes a determination that the foil transfer area TA of the sheet S has reached a position short of the transfer position, and thus turns off the conveyor motor 80, and turns on the nip/release motor 90 (S4, t31). Accordingly, the heating roller 61 is caused to start moving from the separate position toward the nipping position by the nip/release mechanism 70 while the conveyance of the sheet S is stopped.

After step S4, the controller 300 makes a determination as to whether or not the separation sensor SA is turned off (S5). The controller 300 waits until the separation sensor SA is turned off, and if it turns out that the separation sensor SA has been turned off (Yes in step S5, t32), then makes a determination as to whether or not a time period T22 has elapsed from a time at which the separation sensor SA has been turned off (S61). The time period T22 is a period of time required for the heating roller 61 to move from the separate position to the nipping position, i.e., a period of time it takes from a time at which the separation sensor SA is turned off to a time at which the heating roller 61 reaches the nipping position.

In step S61, when the controller 300 having waited the time period T22 since it turns out that the separation sensor SA has been turned off determines that the time period T22 has elapsed from the time at which the separation sensor SA has been turned off (Yes in step S61, t40), the controller 300 turns on the conveyor motor 80 (S62, t40) to restart conveyance of the sheet S, and then makes a determination as to whether or not a time period T23 has elapsed from a time at which the separation sensor has been turned off (S63). The time period T23 is a period of time required for the heating roller 61 to move from the separate position to the nipping position, i.e., a period of time it takes from a time at which the separation sensor SA has been turned off to a time at which the heating roller 61 reaches the nipping position. The time period T23 is longer than the time period T22.

In step S63, when the controller 300 having waited the time period T23 since it turns out that the separation sensor SA has been turned off determines that the time period T23 has elapsed from the time at which the separation sensor SA has been turned off (Yes in step S63, t5), the controller 300 turns off the nip/release motor 90 (S64, t5), and goes to step S9.

The process steps that follows in the central area transfer process is substantially the same as those executed in the forward area transfer process, and thus a duplicate description thereof will be omitted.

Next, one example of the rearward area transfer process as executed by the controller 300 will be described in detail with reference to the flowchart shown in FIG. 10 and the timing chart shown in FIG. 12. The rearward area transfer process is different only in part of a post-transfer process from the central area transfer process, and the other part of process steps (i.e., steps S1 to S5, and S61 to S64) is substantially the same as that of the central area transfer process, and a duplicate description thereof will be omitted.

In the rearward area transfer process, start of separation of the heating roller 61 from the nipping position is not timed after the foil transfer area TA has moved past the transfer position while the sheet S is still in the transfer position, but timed after a trailing edge of a sheet S has moved past the transfer position. Therefore, in the rearward area transfer process, as shown in FIG. 10, the controller 300 makes a determination, after step S64, as to whether or not the sheet sensor SS1 has been turned off (S71).

In step S71, when the controller 300 having waited until the sheet sensor SS1 has been turned off has determined that the sheet sensor SS1 has been turned off (Yes in step S71, t9), then makes a determination as to whether or not there remains a subsequent sheet S to be subjected to the foil transfer process (S72).

If it turns out in step S72 that there remains a subsequent sheet S (Yes in step S72), then the controller 300 causes the subsequent sheet S to be picked up (S73) and makes a determination as to whether or not the trailing edge of the sheet S has moved past the transfer position (S74). It is to be understood that the determination as to whether or not the trailing edge of the sheet S has moved past the transfer position may be made by determining whether or not a time period T3 has elapsed from a time at which the sheet sensor SS1 has been turned off.

In step S74, when the controller 300 having waited until the trailing edge of the sheet S moves past the transfer position has determined that the trailing edge of the sheet S has moved past the transfer position (Yes in step S74, t9), the controller 300 turns on the nip/release motor 90 (t10), causes the heating roller 61 to start moving toward the separate position (S75), and turns off the nip/release motor 90 (S77) after completion of separation (a time at which the heating roller 62 has reached the separate position), and goes to step S2.

On the other hand, if it turns out in step S72 that there remains no subsequent sheet S (No in step S72), then the controller 300 turns on the nip/release motor 90 to start moving the heating roller 91 toward the separate position (S76), turns off the conveyor motor 80 (S77), and brings the rearward area transfer process to an end.

According to this embodiment described above, the following advantageous effects can be achieved.

In the foil transfer device 1, the heating roller 61 and the pressure roller 51 are located apart from each other before execution of foil transfer and caused to be pressed against each other just before starting the foil transfer; therefore, useless transport of the foil film F can be reduced. Furthermore, in the foil transfer device 1, when a foil transfer process executed in the foil save mode starts causing the foil film F to be pressed against a confined surface region (including the foil transfer area TA) on a sheet S, of which the front boundary is located apart from a leading edge of the sheet S, conveyance of the sheet S is stopped before starting causing the foil film F to be pressed against the sheet S, and the conveyance of the sheet S is restarted before the heating roller 61 reaches the nipping position. Therefore, the time elapsing while the foil film F is being pressed against the sheet S of which the conveyance is stopped can be shortened, so that useless conveyance and resulting waste of the foil film F can be reduced, and the likelihood of leaving undesired impressed marks in the sheet S can be diminished.

Moreover, the controller 300 is configured to cause the conveyance of the sheet S to be restarted in the fourth process after the heating roller 61 is brought into contact with the foil film F before the heating roller 61 reaches the nipping position. Therefore, the conveyance of the sheet S is not restarted before the heating roller 61 and the pressure roller 51 are positioned in contact with the foil film F; thus, the resistance which acts on the sheet S if the sheet S is being conveyed when the pressure roller 51 comes in contact with the sheet S and which may thus hinder the conveyance of the sheet S can be obviated. Accordingly, warpage or wrinkling as would be produced in the sheet S between the conveyor roller and the pressure roller can be restrained more effectively.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below. In describing the modified examples, the same structures or processes as those of the above-described embodiment are designated by the same reference characters, and a duplicate description thereof will be omitted.

Figure 12:
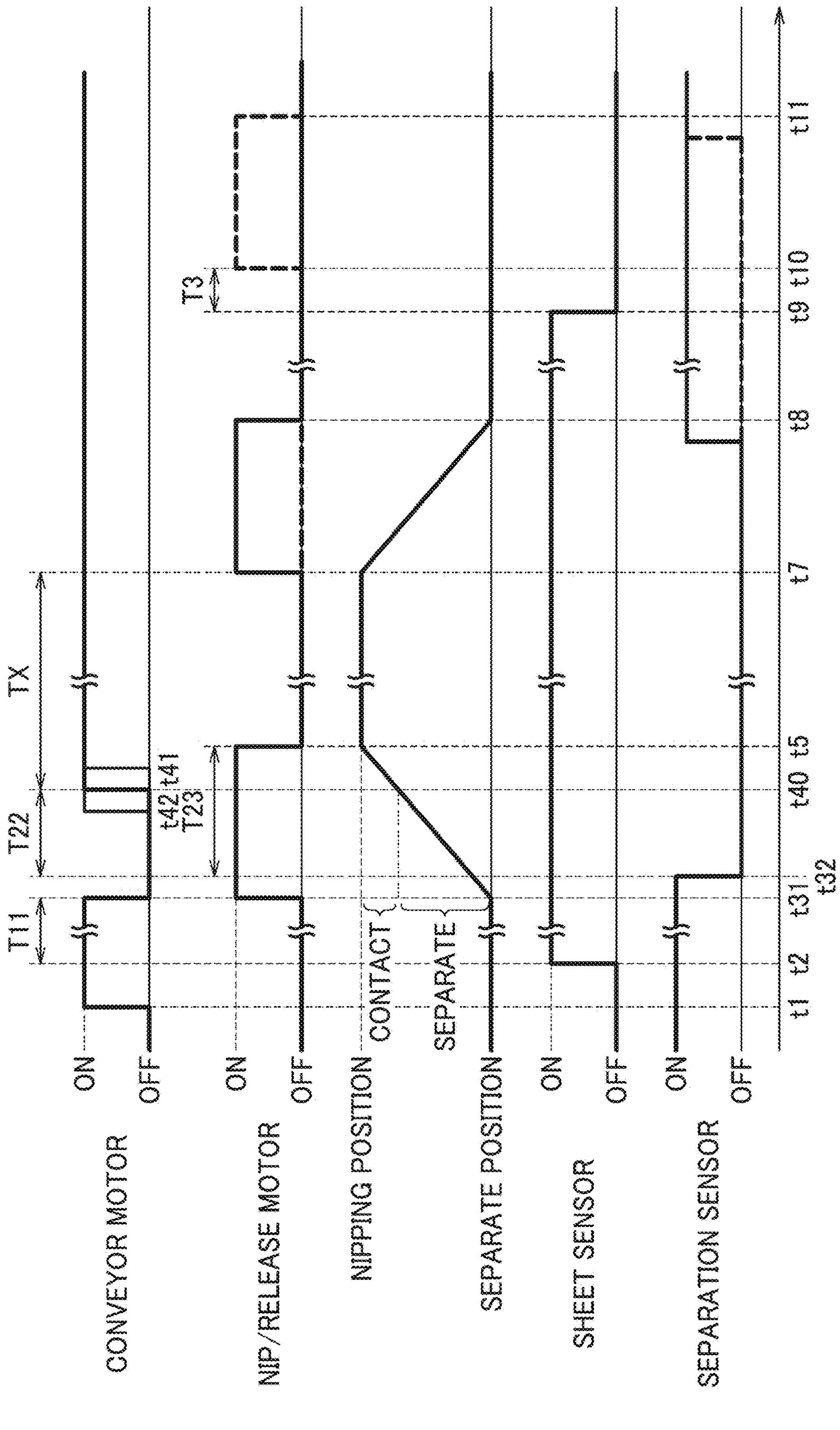
FIG. 12 is a timing chart for explaining timing control exercised in the central area transfer process or the rearward area transfer process.

In the above-described embodiment, the controller 300 is configured to cause the upstream conveyor roller 11C to restart conveyance of a sheet S when the heating roller 61 is positioned in contact with the foil film F; however, conveyance of the sheet S may be restarted at a time, for example, as indicated by a thin line for representing the operation of the conveyor motor 80 in FIG. 12, after the heating roller 61 is positioned in contact with the foil film F before the heating roller reaches the nipping position (time t41). In this alternative embodiment, warpage or wrinkling as would be produced in the sheet S between the upstream conveyor roller 11C and the pressure roller 51 can be restrained more effectively than in the above-described embodiment.

In the above-described embodiment, the controller 300 is configured to cause the upstream conveyor roller 11C to restart conveyance of a sheet S when the heating roller 61 is positioned in contact with the foil film F; however, conveyance of the sheet S may be restarted at a time, for example, as indicated by another thin line (thinner than the line at time t41) for representing the operation of the conveyor motor 80 in FIG. 12, before the heating roller 61 is positioned in contact with the foil film F (time t41). In this alternative embodiment, the likelihood of leaving undesired impressed marks in the sheet S can be diminished or minimized with increased reliability in comparison with the above-described embodiment.

In the above-described embodiment, the step S4 in FIGS. 7, 8, and 9 shows a specific example in which the conveyor motor 80 is turned off and simultaneously the nip/release motor 90 is turned on (see also time t3 in FIG. 11 and time t31 in FIG. 12); however, the conveyor motor 80 may be turned off in advance, and the nip/release motor 90 may be turned on later after a predetermined period of waiting time.

In the above-described embodiment, the confined surface region against which the foil film F is to be pressed for foil transfer is determined by a user specifying a transfer mode, a forward margin length, and a foil transfer length for each foil transfer process; however, an alternative configuration may be feasible such that the controller detects a toner image on a sheet to determine the confined surface region against which the foil film is to be pressed for foil transfer.

In the above-described embodiment, when the pressure roller 51 is stopped or in other occasions in each mode, all of the conveyor rollers 11A to 12B are stopped; however, it may be feasible that only one or more conveyor rollers in contact with the sheet S are stopped.

In the above-described embodiment, the heating roller 61 is moved, relative to the pressure roller 51, between the nipping position and the separate position; however, it may be feasible that the pressure roller 51 is moved, relative to the heating roller 61, between the nipping position and the separate position.

In the above-described embodiment, the foil transfer device for transferring foil onto a toner image formed on a sheet is described: however, the foil transfer device may be any type of device configured to transfer foil onto a sheet.

In the above-described embodiment, the supply reel 31 and the take-up reel 35 are both provided in the film unit FU; alternatively, the supply reel may be provided in the film unit and the take-up reel may be provided in the housing.

In the above-described embodiment, the entry section B1 with buttons shown in the touch panel TP is described as an example of the entry section; alternatively, the entry section may comprise push buttons (switches) that can be moved by operation of a user to a pressed position and to a release position.

In the above-described embodiment, the controller is configured to execute processes in each mode selected based on signals from the touch panel TP; alternatively, for example, where an image forming apparatus and a foil transfer device are configured integrally in one device, the controller may make a determination as to the location and size (length or other dimensions) of the toner area on the surface of a sheet based on image data included in a printing/transfer instruction, and choose one of the modes based on the location and size of the toner area.

In the above-described embodiment, the sheet sensor is comprised of a lever and an optical sensor for detecting the lever; alternatively, the sheet sensor may be comprised only of an optical sensor.

In the above-described embodiment, the transfer unit 50 is configured to comprise a heating roller 61 and a pressure roller 51; it is however to be understood that the heating roller provided to heat a foil film and a sheet in the transfer unit may be substituted by a planer heating element, a heating belt, a thermal head, etc., and the pressure roller configured to rotate with the foil film and the sheet being nipped between the heating roller and the pressure roller to thereby cause the sheet to move forward together with the foil film in the transfer unit may be substituted by a planer member, a pressure belt, a pressure head, etc.

The foil film F described above has a four-layer structure as an example, but the foil film may have any number of layers as long as it includes a transfer layer and a supporting layer.

The elements described in the above embodiment and modified examples may be implemented selectively and in combination.

What is claimed is:

1. A foil transfer device for transferring foil onto a sheet laid on a foil film containing the foil, the foil transfer device comprising:

a heating roller configured to heat the foil film and the sheet;

a pressure roller configured to rotate, with the foil film and the sheet being nipped between the heating roller and the pressure roller, to thereby cause the sheet to move forward together with the foil film;

a nip/release mechanism configured to move a first roller that is one of the heating roller and the pressure roller, relative to a second roller that is another of the heating roller and the pressure roller, between a nipping position in which the first roller is pressed against the second roller, and a separate position in which the first roller is located apart from the second roller;

a conveyor roller configured to convey the sheet to a transfer position in which the foil film and the sheet are to be nipped between the heating roller and the pressure roller to transfer foil onto the sheet; and a controller configured to exercise control over the nip/release mechanism and the conveyor roller, and capable of executing a foil transfer process in a foil save mode in which foil is transferred partially on a surface of the sheet by causing the foil film to be pressed against a confined surface region that is part of an entire area of the surface of the sheet as defined by front and rear boundaries thereof on the sheet in a direction of conveyance of the sheet, wherein when the nip/release mechanism is caused to move the first roller and starts causing the foil film to be pressed against the confined surface region of the sheet, of which the front boundary is located apart from a leading edge of the sheet, the controller executes:

a first process of causing the conveyor roller to start conveyance of the sheet, while the first roller is positioned in the separate position;

a second process of causing the conveyor roller to stop conveyance of the sheet before a foil transfer area defined on the surface of the sheet as an area onto which foil is to be transferred reaches the transfer position;

a third process of causing the nip/release mechanism to start moving the first roller from the separate position to the nipping position while the conveyance of the sheet is stopped; and a fourth process of causing the conveyor roller to restart conveyance of the sheet before the first roller reaches the nipping position.

2. The foil transfer device according to claim 1, wherein the controller is configured to cause the conveyor roller to restart the conveyance of the sheet in the fourth process after the first roller and the second roller are caused to be positioned in contact with the foil film or the sheet before the first roller reaches the nipping position.

3. The foil transfer device according to claim 2, further comprising a separation sensor that detects a position of the first roller, wherein the controller is configured to determine a time of restarting conveyance of the sheet in the fourth process, based on a signal received from the separation sensor.

4. The foil transfer device according to claim 1, further comprising a sheet sensor located in a position upstream of the heating roller along a path of conveyance of the sheet to detect the sheet, wherein the controller is configured to determine a time of stopping conveyance of the sheet in the second process, based on a period of time that has elapsed from a time of detection of a leading edge of the sheet by the sheet sensor.

5. The foil transfer device according to claim 1, further comprising a first motor configured to drive the nip/release mechanism and a second motor configured to drive the conveyor roller.

6. The foil transfer device according to claim 1, wherein the nip/release mechanism includes a cam movable between a first position in which the first roller is located in the nipping position and a second position in which the first roller is located in the separate position.

7. The foil transfer device according to claim 6, wherein the cam is rotatable.

8. A foil transfer device for transferring foil onto a sheet laid on a foil film containing the foil, the foil transfer device comprising:

a first roller and a second roller, the first roller being movable relative to the second roller, between a nipping position in which the first roller is pressed against the second roller and a separate position in which the first roller is located apart from the second roller;

a conveyor roller configured to convey the sheet to a transfer position in which the foil film and the sheet are to be nipped between the first roller and the second roller to transfer foil onto the sheet; and a controller configured to execute:

a first process of causing the conveyor roller to start conveyance of the sheet, while the first roller is positioned in the separate position;

a second process of causing the conveyor roller to stop conveyance of the sheet before a foil transfer area defined on a surface of the sheet as an area onto which foil is to be transferred reaches the transfer position;

a third process of causing the first roller to start moving from the separate position to the nipping position while the conveyance of the sheet is stopped; and a fourth process of causing the conveyor roller to restart conveyance of the sheet before the first roller reaches the nipping position.

9. The foil transfer device according to claim 8, wherein the controller is configured to cause the conveyor roller to restart the conveyance of the sheet in the fourth process after the first roller and the second roller are caused to be positioned in contact with the foil film or the sheet before the first roller reaches the nipping position.

10. The foil transfer device according to claim 9, further comprising a separation sensor that detects a position of the first roller, wherein the controller is configured to determine a time of restarting conveyance of the sheet in the fourth process, based on a signal received from the separation sensor.

11. The foil transfer device according to claim 8, further comprising a sheet sensor located in a position upstream of the first roller and the second roller along a path of conveyance of the sheet to detect the sheet, wherein the controller is configured to determine a time of stopping conveyance of the sheet in the second process, based on a period of time that has elapsed from a time of detection of a leading edge of the sheet by the sheet sensor.

12. The foil transfer device according to claim 8, further comprising:

a cam movable under control of the controller between a first position in which the first roller is located in the nipping position and a second position in which the first roller is located in the separate position;

a first motor configured to drive the cam; and a second motor configured to drive the conveyor roller.

13. The foil transfer device according to claim 12, wherein the cam is rotatable.

* * * * *